(12) United States Patent
Sekiguchi

(10) Patent No.: US 11,770,872 B2
(45) Date of Patent: Sep. 26, 2023

(54) RADIO APPARATUS, RADIO COMMUNICATION SYSTEM, AND RADIO COMMUNICATION METHOD

(71) Applicant: JVCKENWOOD CORPORATION, Yokohama (JP)

(72) Inventor: Tomomi Sekiguchi, Kanagawa (JP)

(73) Assignee: JVCKENWOOD CORPORATION, Yokohama (JP)

( * ) Notice: Subject to any disclaimer, the term of this patent is extended or adjusted under 35 U.S.C. 154(b) by 171 days.

(21) Appl. No.: 16/931,012

(22) Filed: Jul. 16, 2020

(65) Prior Publication Data

US 2021/0022199 A1 Jan. 21, 2021

(30) Foreign Application Priority Data

Jul. 19, 2019 (JP) .................................. 2019-133391
Jul. 19, 2019 (JP) .................................. 2019-133392

(51) Int. Cl.
| | |
|---|---|
| *H04W 76/25* | (2018.01) |
| *G10L 17/22* | (2013.01) |
| *H04L 5/16* | (2006.01) |
| *H04W 76/45* | (2018.01) |

(52) U.S. Cl.
CPC ............. *H04W 76/25* (2018.02); *G10L 17/22* (2013.01); *H04L 5/16* (2013.01); *H04W 76/45* (2018.02)

(58) Field of Classification Search
CPC ...... H04W 76/25; H04W 76/45; G10L 17/22; G10L 2015/088; H04L 5/16
See application file for complete search history.

(56) References Cited

U.S. PATENT DOCUMENTS

| | | | |
|---|---|---|---|
| 9,338,803 B2* | 5/2016 | Shimizu | H04W 4/10 |
| 2005/0265311 A1* | 12/2005 | Kuure | H04W 76/25 370/352 |
| 2009/0036154 A1* | 2/2009 | Tamura | H04W 4/10 455/518 |
| 2010/0048235 A1* | 2/2010 | Dai | G11B 27/105 455/518 |
| 2010/0085952 A1 | 4/2010 | Wiatrowski et al. | |
| 2015/0223110 A1* | 8/2015 | Lindner | H04W 4/08 455/518 |
| 2016/0036870 A1 | 2/2016 | Matsui | |
| 2016/0232893 A1* | 8/2016 | Subhojit | G10L 15/063 |
| 2017/0208444 A1* | 7/2017 | He | H04W 76/45 |
| 2017/0332228 A1* | 11/2017 | Oda | H04W 8/22 |
| 2019/0378493 A1* | 12/2019 | Kim | G10L 15/05 |
| 2021/0193176 A1* | 6/2021 | Doshi | G10L 15/19 |

FOREIGN PATENT DOCUMENTS

| | | |
|---|---|---|
| JP | 2007-243864 A | 9/2007 |
| JP | 2016-33811 A | 3/2018 |

* cited by examiner

*Primary Examiner* — Oussama Roudani
(74) *Attorney, Agent, or Firm* — Procopio, Cory, Hargreaves & Savitch LLP

(57) ABSTRACT

A radio apparatus includes a session control unit configured to maintain a half-duplex session with a radio apparatus at the other end during a session keeping time, a voice recognition unit configured to recognize a predetermined voice in the session, and an extension unit configured to extend the session keeping time when the predetermined voice is recognized.

9 Claims, 20 Drawing Sheets

RADIO APPARATUS, RADIO COMMUNICATION SYSTEM, AND RADIO COMMUNICATION METHOD

CROSS REFERENCE TO RELATED APPLICATION

This application is based upon and claims the benefit of priority from Japanese patent application No. 2019-133391, filed on Jul. 19, 2019, and Japanese patent application No. 2019-133392, filed on Jul. 19, 2019, the disclosure of which is incorporated herein in its entirety by reference.

BACKGROUND

The present disclosure relates to a radio apparatus, a radio communication system, and a radio communication method.

In radio apparatuses such as radio systems for business use, a communication method through a half-duplex session, specifically, a PTT (Push to Talk) method in which a radio apparatus in which a call button is being pressed can transmit a voice is used. Further, with such radio apparatuses, it is possible to perform a group call (one-to-many call) between one radio apparatus and a plurality of radio apparatuses as well as making an individual call (one-to-one call) between one radio apparatus and another radio apparatus.

Japanese Unexamined Patent Application Publication No. 2007-243864 discloses a technique related to such radio apparatuses. In particular, Japanese Unexamined Patent Application Publication No. 2007-243864 discloses a radio apparatus which is used while switching its mode between a group call mode and an individual call mode. Further, Japanese Unexamined Patent Application Publication No. 2016-33811 discloses a technique related to a session. In particular, Japanese Unexamined Patent Application Publication No. 2016-33811 discloses the duration of a session identified by an IP address and a port number is dynamically extended in response to a request from a terminal or the reception of an Ack signal.

SUMMARY

In the above-described radio apparatus disclosed in Japanese Unexamined Patent Application Publication No. 2007-243864, it is possible to perform a group call or make an individual call according to a designation by a user. For example, in the case of a radio system for business use, a group call is often used as a default setting. In such a case, when no call is made for a predetermined time after an individual call is performed (i.e., ended), it is often presumed that the session is ended and hence the radio system is restored to the group call setting. That is, in the radio apparatus in the related art, a session keeping time for maintaining a session is set in order to control a group call, an individual call, and the like.

However, there is a problem that there are cases in which desired communication cannot be performed because of the setting of the session keeping time or the like.

Further, other radio apparatuses, i.e., radio apparatuses other than those performing communication through the session, cannot recognize the session keeping time of the session. Therefore, in the related art, there is another problem that communication that is performed through the session may be interfered with by a radio signal transmitted from other radio apparatuses.

An embodiment provides a radio apparatus including: a session control unit configured to maintain a half-duplex session with a radio apparatus at the other end during a session keeping time; a voice recognition unit configured to recognize a predetermined voice in the session; and an extension unit configured to extend the session keeping time when the predetermined voice is recognized.

Another embodiment provides a radio communication system including: a radio apparatus on a calling side, and a radio apparatus on a receiving side, in which the radio apparatus on the calling side includes: a session control unit configured to maintain a half-duplex session with the radio apparatus on the receiving side during a session keeping time on the calling side; a voice recognition unit configured to recognize a predetermined voice to be transmitted in the session; and an extension unit configured to extend the session keeping time on the calling side when the predetermined voice is recognized, and the radio apparatus on the receiving side includes: a session control unit configured to maintain a half-duplex session with the radio apparatus on the calling side during a session keeping time on the receiving side; a voice recognition unit configured to recognize a predetermined voice received in the session; and an extension unit configured to extend the session keeping time on the receiving side when the predetermined voice is recognized.

Another embodiment provides a radio communication method including: maintaining a half-duplex session with a radio apparatus at the other end during a session keeping time; recognizing a predetermined voice in the session; and extending the session keeping time when the predetermined voice is recognized.

Another embodiment provides a radio apparatus including: a radio communication unit configured to perform radio communication between a first radio apparatus and a second radio apparatus; a setting unit configured to set a session keeping time, the session keeping time being a time during which a half-duplex session is maintained between the first and second radio apparatuses; and a restriction unit configured to restrict transmission of a radio signal to the first and second radio apparatuses based on the set session keeping time.

Another embodiment provides a radio communication system including a first radio apparatus, a second radio apparatus, and a third radio apparatus, in which the third radio apparatus includes: a radio communication unit configured to perform radio communication between the first and second radio apparatuses; a setting unit configured to set a session keeping time, the session keeping time being a time during which a half-duplex session is maintained between the first and second radio apparatuses; and a restriction unit configured to restrict transmission of a radio signal to the first and second radio apparatuses based on the set session keeping time.

Another embodiment provides a radio communication method including: performing radio communication between a first radio apparatus and a second radio apparatus; setting a session keeping time, the session keeping time being a time during which a half-duplex session is maintained between the first and second radio apparatuses; and restricting transmission of a radio signal to the first and second radio apparatuses based on the set session keeping time.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Figure 1:
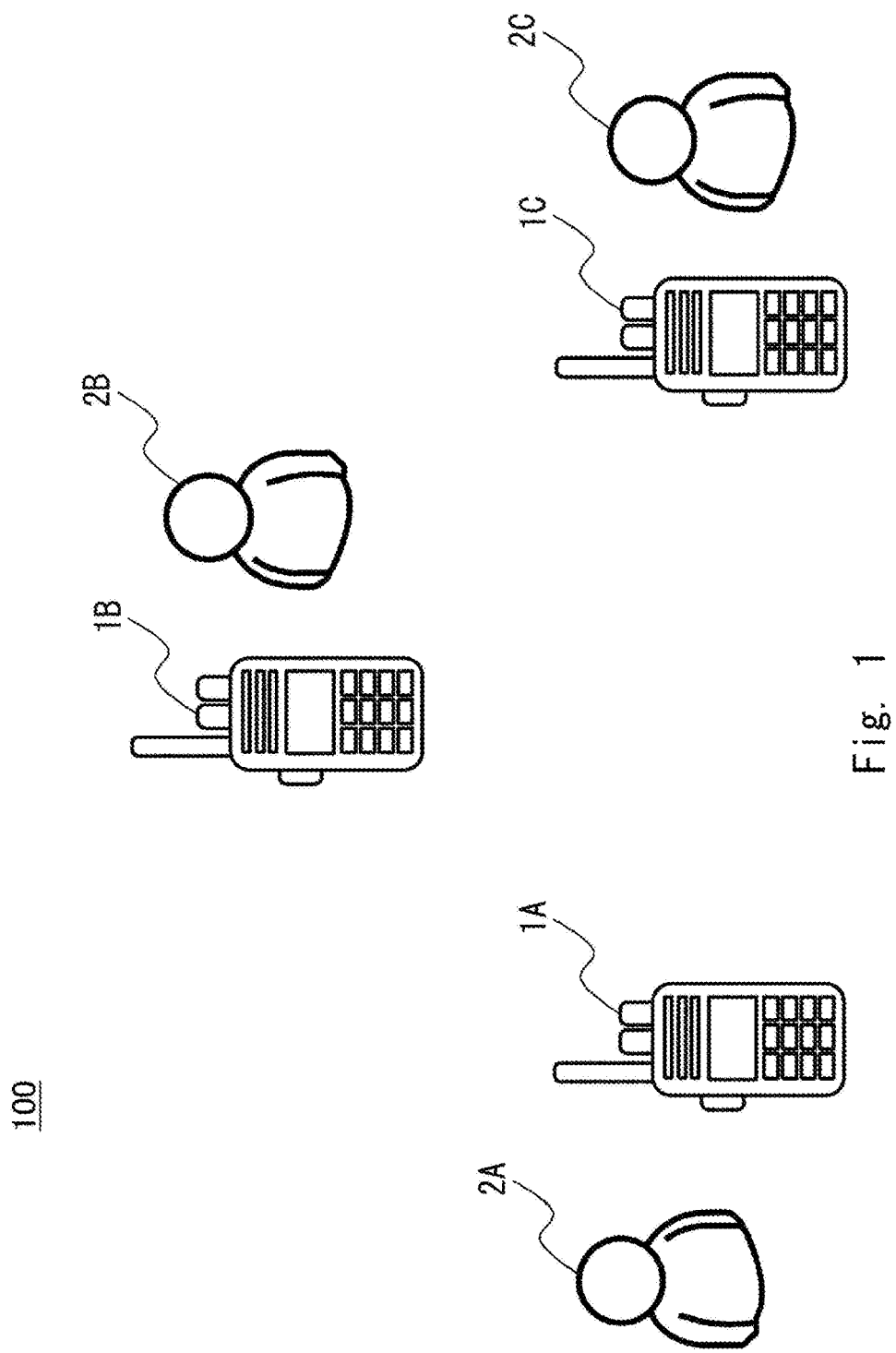
FIG. 1 is a block diagram showing an example of a configuration of a radio communication system according to a first embodiment.

A first embodiment will be described hereinafter with reference to the drawings. FIG. 1 shows an example of a configuration of a radio communication system according to this embodiment. As shown in FIG. 1, a radio communication system 100 according to this embodiment is, for example, a radio communication system for business use, and includes a plurality of radio apparatuses 1 which wirelessly communicate with each other. In this example, the radio communication system 100 includes a radio apparatus 1A (a first radio apparatus), a radio apparatus 1B (a second radio apparatus), and a radio apparatus 1C (a third radio apparatus) used by speakers 2A, 2B, and 2C, respectively. Each of the radio apparatuses 1 is a so-called transceiver and makes a call by a PTT method using a session in accordance with a half-duplex communication technique. Further, the radio apparatus 1 performs a group call for a specific group or makes an individual call with a specific radio apparatus according to the operation performed by the speaker 2.

Note that in the following descriptions, an example in which the radio apparatus 1 transmits and receives voice data, and thereby makes a voice call is mainly described. However, other types of data may be transmitted and received instead of or in addition to the voice data. Further, if necessary, the radio communication system 100 may include a repeater or the like that relays radio communication.

In this embodiment, an example in which the radio apparatus 1 performs a group call and makes an individual call using a designated ID in a digital conventional environment is described. For example, when the radio apparatus 1A on the calling side (hereinafter also referred to as the calling-side radio apparatus 1A) starts an individual call with the radio apparatus 1B on the receiving side (hereinafter also referred to as the receiving-side radio apparatus 1B), the radio apparatus 1A alerts for call (or calls) the radio apparatus 1B, upon the speaker 2A selects and designates the ID of the radio apparatus 1B at the other end of the call (hereinafter also referred to simply as "at the other end") and then presses a PTT button. When the speaker 2A presses the PTT button without designating the other party (i.e., the radio apparatus at the other end), the call does not become an individual call and instead becomes a group call. When the radio apparatus 1B, which has been alerted from the radio apparatus 1A, responds to the alert, the radio apparatuses 1A and 1B enter a call state, so that the speaker can make a call (i.e., send his/her voice) to the other party just by pressing the PTT button without performing the operation for designating the other party. When no call has been started from either of the radio apparatuses 1A and 1B for a certain period, the call state is cancelled. After that, they return to the state in which when the speaker simply presses the PTT button (i.e., presses the PTT button without designating the other party), the call becomes a group call. The certain period during which the call state (the session) is continued, i.e., the time until the call state is cancelled (the radio apparatus returns from the individual call state to the group call state) is referred to as a "call state continuation time" (or a "session keeping time"). If the call state continuation time is too long, it takes time for the radio apparatus to automatically return from the individual call state to the group call state, thus increasing the number of situations in which the group call, which is the default setting, cannot be performed. Therefore, it is necessary to set the call state continuation time to an appropriate length so that calls such as business calls are not hindered.

It is possible to make various settings in the radio apparatus 1 by using a purpose-built PC application (e.g., an application program for a personal computer). Further, it is also possible to set the call state continuation time to an arbitrary length by using a PC application.

<Operation of First Examined Example>

In order to help the understanding of this embodiment, a first examined example to which this embodiment is not applied will be described. In the first examined example, a call state continuation time can be set in advance by using a PC application in a radio apparatus in a digital conventional environment. However, since there is no method for dynamically changing this call state continuation time during operation, the operation is always performed with the call state continuation time having a fixed value. Therefore, in the first examined example, when the call state continuation time is set to a small value, the below-described problem arises. That is, when the receiving side attempts to return a reply to a question sent from the calling side, the receiving side may inadvertently return the reply to an entity (e.g., a person or an apparatus) different from the intended entity (e.g., the intended person or apparatus). Details of this problem will be described hereinafter.

Figure 2:
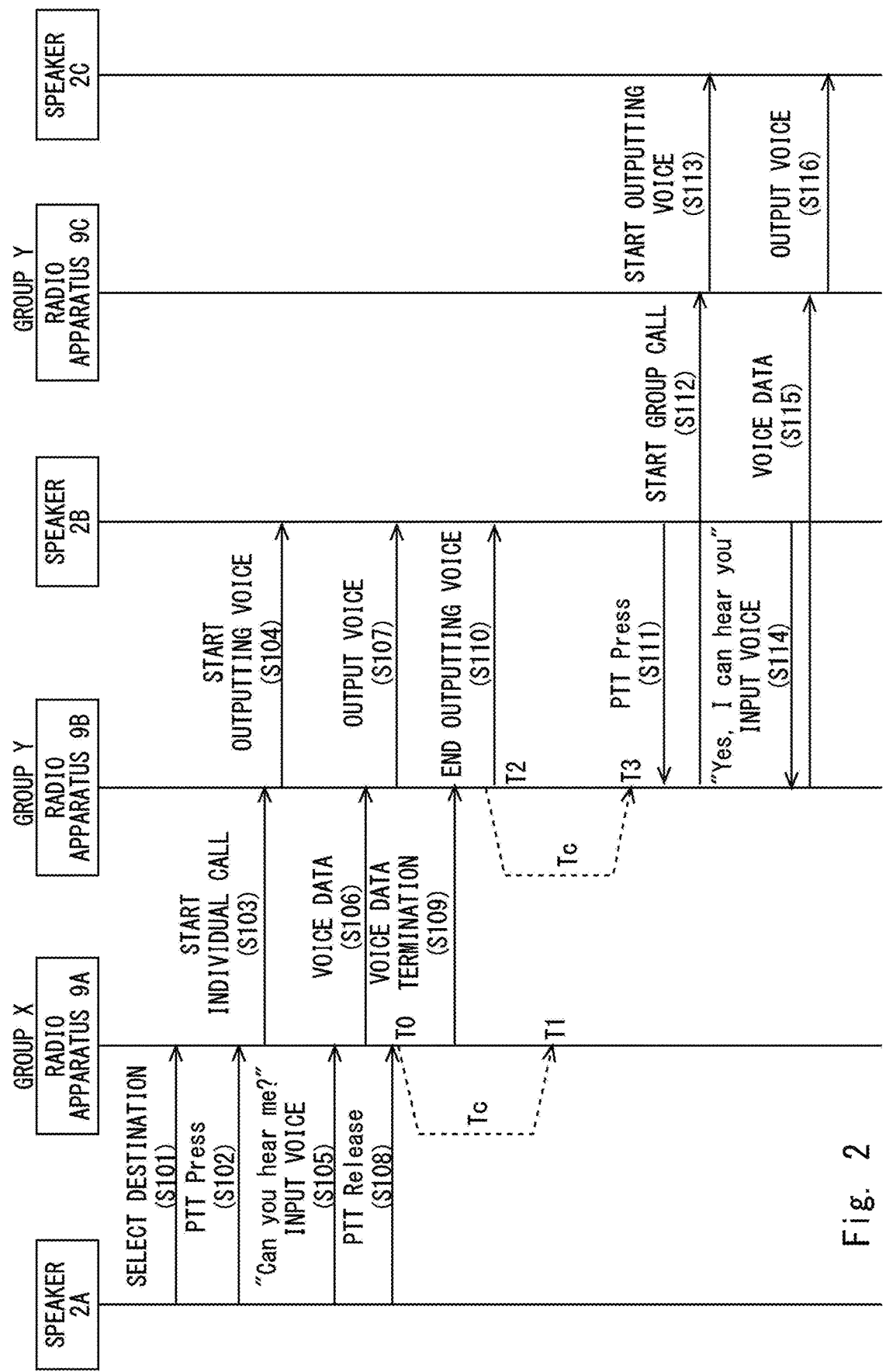
FIG. 2 is a sequence diagram showing an example of operations performed by a radio apparatus according to a first examined example.

FIG. 2 shows operations performed in the first examined example in the case where this problem occurs, and FIGS. 3A to 3F show examples of images displayed in the radio apparatus in this case. Note that the radio apparatus in the first examined example is referred to as a radio apparatus 9.

Figure 3C:
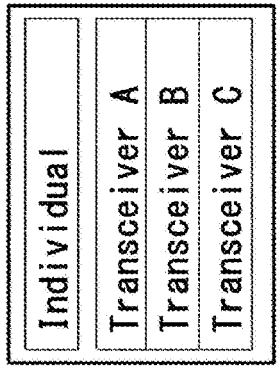
FIGS. 3A to 3F show examples of images displayed in the radio apparatus according to the first embodiment and the radio apparatus according to the first examined example.
Figure 3F:
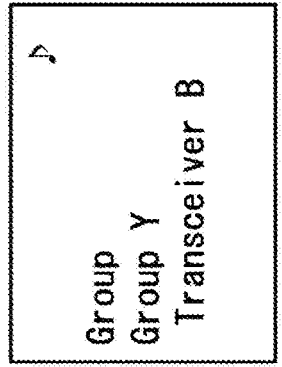
Figure 3B:
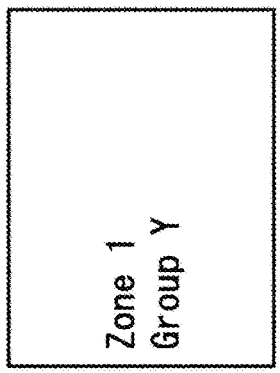
Figure 3E:
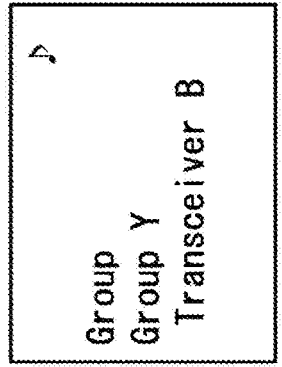
Figure 3A:
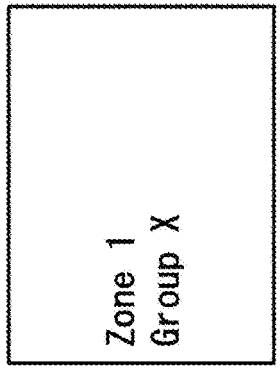

FIG. 2 shows an example in which an individual call is made by specifying an ID in a digital conventional environment, and the radio apparatuses 9A to 9C perform a group call or make an individual call according to the operations performed by the speakers 2A to 2C, respectively. In the example shown in FIG. 2, the radio apparatus 9A waits for a call with a group ID=X, and the radio apparatuses 9B and 9C wait for a call with a group ID=Y. For example, the speakers 2A to 2C operate the radio apparatuses 9A to 9C, respectively, to select a channel for the group. Further, a waiting state (waiting) for the group X is displayed in the radio apparatus 9A as shown in FIG. 3A, and a waiting state for the group Y is displayed in each of the radio apparatuses 9B and 9C as shown in FIG. 3B.

Figure 3D:
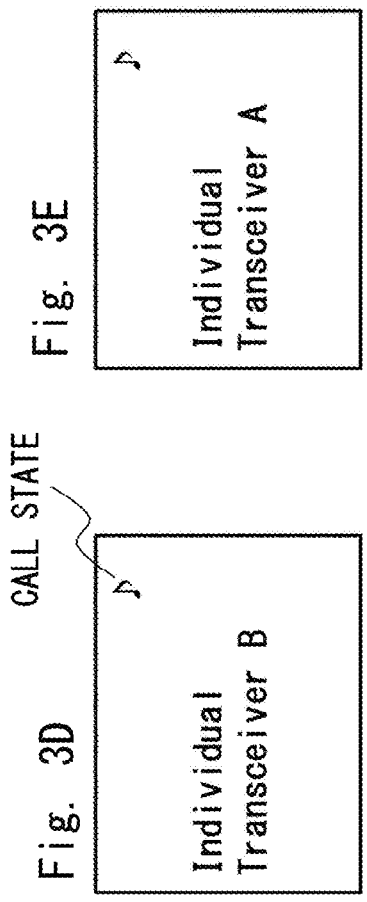

In this state, an individual call is started from the calling-side radio apparatus 9A to the receiving-side radio apparatus 9B. That is, the radio apparatus 9A displays a list of destination IDs as shown in FIG. 3C in response to the operation performed by the speaker 2A and selects the radio apparatus 9B (Transceiver B) at the other end (S101). When the speaker 2A presses the PTT button of the radio apparatus 9A in the state where the radio apparatus 9B is selected (S102), the radio apparatus 9A transmits an individual call start in which the ID of the selected radio apparatus 9B is set as the destination of the call and the ID of the radio apparatus 9A is the source of the call (i.e., as the entity from which the call is transmitted) (S103). In this state, as shown in FIG. 3D, the radio apparatus 9A displays the call state (call in progress) of the individual call with the radio apparatus 9B. For example, the call state, i.e., the fact that the call is in progress is indicated by a musical-note icon displayed at the upper-right corner of the display unit. When the radio apparatus 9B receives this individual call start, it starts outputting voices sent from the radio apparatus 9A (S104). At this point, the radio apparatus 9B displays the call state of the individual call with the radio apparatus 9A as shown in FIG. 3E.

Next, the speaker 2A asks (i.e., sends) a question "Can you hear me?" from the radio apparatus 9A to the radio apparatus 9B (S105). When the speaker 2A speaks "Can you hear me?" while pressing the PTT button of the radio apparatus 9A, the radio apparatus 9A transmits its voice data to the radio apparatus 9B (S106). Further, upon receiving the voice data, the radio apparatus 9B outputs the voice "Can you hear me?" for the speaker 2B (S107).

After that, the speaker 2A ends the transmission by moving his/her hand off the PTT button (i.e., releasing the PTT button) of the radio apparatus 9A. When the speaker 2A moves his/her hand off the PTT button of the radio apparatus 9A (S108), the radio apparatus 9A transmits a voice data termination to the radio apparatus 9B (S109). Further, upon receiving voice data termination, the radio apparatus 9B ends the outputting of voices (S110).

The calling-side radio apparatus 9A continues the call state from a time T0 at which the hand was moved off the PTT button or it transmitted the voice data termination until a time T1 at which the call state continuation time Tc set in the radio apparatus 9A has elapsed. The radio apparatus 9A displays the call state of the individual call with the radio apparatus 9B during the call state continuation time Tc because during which the call state is continued as shown in FIG. 3D. Then, after the call state continuation time Tc has elapsed, the radio apparatus 9A returns to the group call state, so that it displays the waiting state for the group X as shown in FIG. 3A. Further, the receiving-side radio apparatus 9B continues the call state from a time T2 at which the outputting of voices ended or it received the voice data termination until a time T3 at which the call state continuation time Tc set in the radio apparatus 9B has elapsed. The radio apparatus 9B displays the call state of the individual call with the radio apparatus 9A during the call state continuation time Tc because during which the call state is continued as shown in FIG. 3E. Then, after the call state continuation time Tc has elapsed, the radio apparatus 9B returns to the group call state, so that it displays the waiting state for the group Y as shown in FIG. 3B.

For example, it is assumed that the call state continuation time Tc which is set in advance in the receiving-side radio apparatus 9B is three seconds. Then, if the speaker 2B attempts to respond to the call by pressing the PTT button of the radio apparatus 9B five seconds after the radio apparatus 9B received the voice data termination from the radio apparatus 9A (S111), its transmission (i.e., its response) does not become the response to the individual call from the radio apparatus 9A, but becomes the transmission for a group call as described as the above problem. That is, the radio apparatus 9B transmits a group call start (S112), and the radio apparatus 9C, which is waiting a call with the same group ID, receives this group call start and starts outputting voices (S113). Therefore, subsequently, if the speaker 2B speaks "Yes, I can hear you." to the radio apparatus 9B (S114), its voice data is transmitted as the group call (S115) and the radio apparatus 9C outputs the voice "Yes, I can hear you." for the speaker 2C (S116). As shown in FIG. 3F, the call state with the radio apparatus 9B belonging to the group Y is displayed in the radio apparatus 9C. As described above, in the examined example 1, even if the radio apparatus 9B attempts to respond to the individual call with the radio apparatus 9A, the call (i.e., the response) becomes the group call involving the radio apparatus 9C. Therefore, the intended call (i.e., the desired call) cannot be made.

<Operation in First Embodiment>

In view of the problem described above in the first examined example, this embodiment is configured so that when voice recognition processing is performed for a received voice and, for example, a keyword related to a "question" is detected in the receiving-side radio apparatus, the call state continuation time is dynamically changed to a time longer than the normal time for enabling a longer operation, so that even if the timing at which the response is transmitted is somewhat delayed, a correct response can be returned to the other party (e.g., the person or the radio apparatus at the other end). Note that the call state continuation time may have a fixed value or a value that has been learned during the operation.

Figure 4:
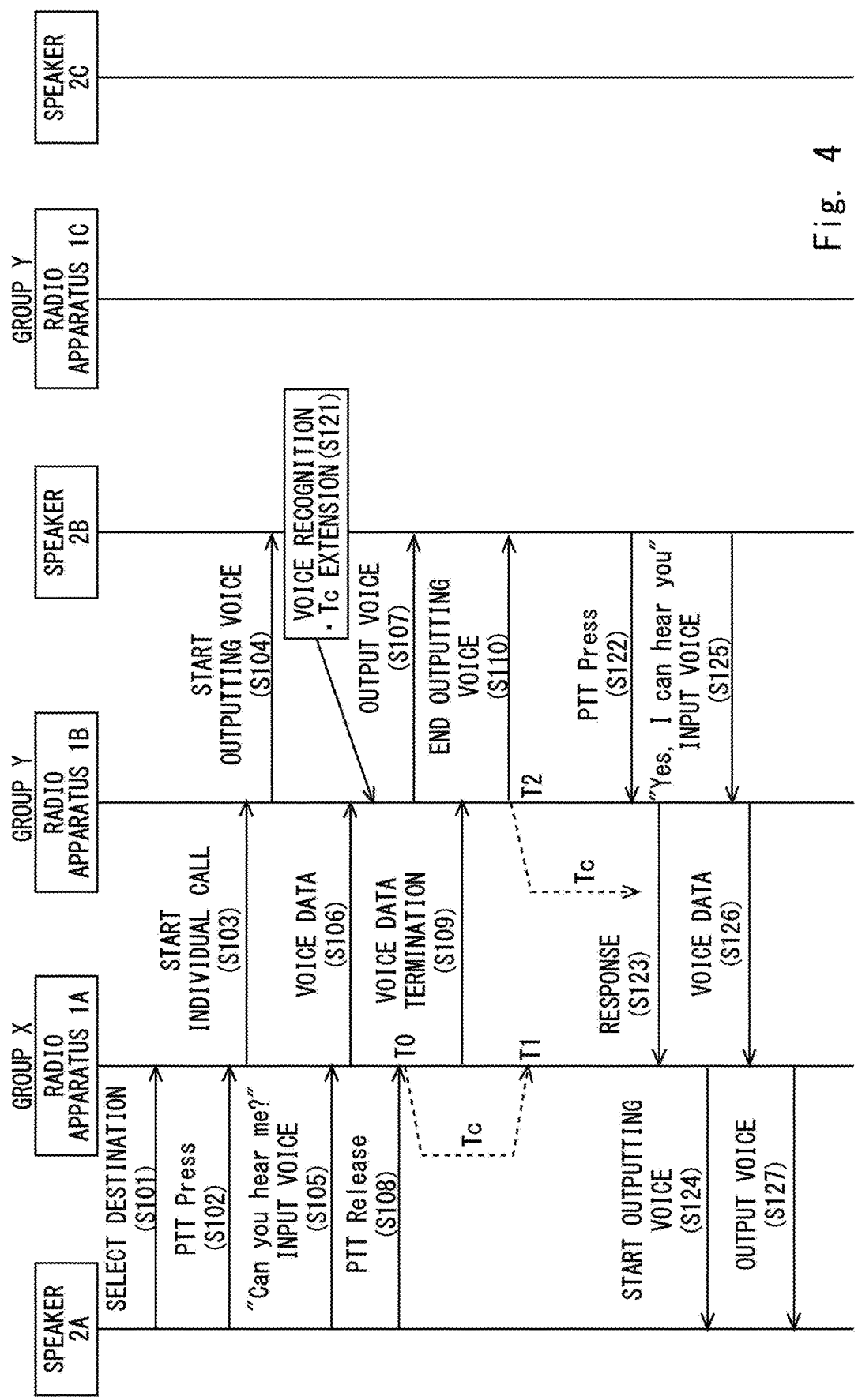
FIG. 4 is a sequence diagram showing an example of operations performed by the radio apparatus according to the first embodiment.

FIG. 4 shows operations performed by a radio communication system according to this embodiment, i.e., performed in a case in which this embodiment is applied to the first examined example shown in FIG. 2.

As shown in FIG. 4, similarly to FIG. 2, in a state where the radio apparatus 1A waits for a call with a group ID=X and the radio apparatuses 1B and 1C wait for a call with a group ID=Y, the calling-side radio apparatus 1A starts an individual call to the receiving-side radio apparatus 1B by designating an ID thereof (S101 to S104).

Next, while pressing the PTT button, the speaker asks (i.e., sends) a question "Can you hear me?" from the radio apparatus 1A for the radio apparatus 1B (S105), and its voice data is transmitted form the radio apparatus 1A to the radio apparatus 1B (S106). Note that in this embodiment, the receiving-side radio apparatus 1B analyzes the voice data, which has been wirelessly received from the calling-side radio apparatus 1A, and recognizes, for example, a "question" (S121). Upon recognizing the "question", the radio apparatus 1B dynamically extends the call state continuation time Tc, which has been started when it received the voice data termination from the radio apparatus 1A, and sets it to a time (e.g., 10 seconds) longer than the normal time (e.g., 3 seconds). Note that regarding the length of the time by which the call state continuation time is extended, it may be extended by a predetermined time when the voice is recognized, or may be extended by a time that changes according to the recognized voice. For example, it may be a time corresponding to the length of the recognized voice.

After that, the speaker 2A moves his/her hand off the PTT button of the radio apparatus 1A and thereby ends the transmission (S108 to S110). Similarly to the first examined example, the calling-side radio apparatus 1A continues the call state from a time T0 at which the hand was moved off the PTT button or it transmitted the voice data termination until a time T1 at which the call state continuation time Tc has elapsed. Meanwhile, the receiving-side radio apparatus 1B continues the call state from a time T2 at which the outputting of voices ended or it received the voice data termination until the extended call state continuation time Tc has elapsed.

For example, when the speaker 2B attempts to respond to the call by pressing the PTT button of the radio apparatus 1B five seconds after the radio apparatus 1B received the voice data termination from the radio apparatus 1A (S122), its transmission (i.e., the response) does not become the transmission for the group call, but becomes a response to the individual call from the radio apparatus 1A. Therefore, it is possible to returns a correct response to the intended party (i.e., the intended radio apparatus or person at the other end). That is, unlike the first examined example, in this embodiment, since the call state is maintained until the extended call state continuation time Tc has elapsed, the radio apparatus 1B transmits the response to the radio apparatus 1A (S123) and the radio apparatus 1A starts outputting voices (S124). Note that in this example, since each message is transmitted with the ID of the destination contained therein during the communication, the radio apparatus 1A can receive the response even after the call state continuation time Tc has already elapsed. Subsequently, when the speaker 2B speaks "Yes, I can hear you." to the radio apparatus 1B (S125), its voice data is transmitted to the radio apparatus 1A (S126) and the radio apparatus 1A outputs the voice "Yes, I can hear you." for the speaker 2A (S127).

<Configuration and Operation of Radio Apparatus on Receiving Side in First Embodiment>

Figure 5:
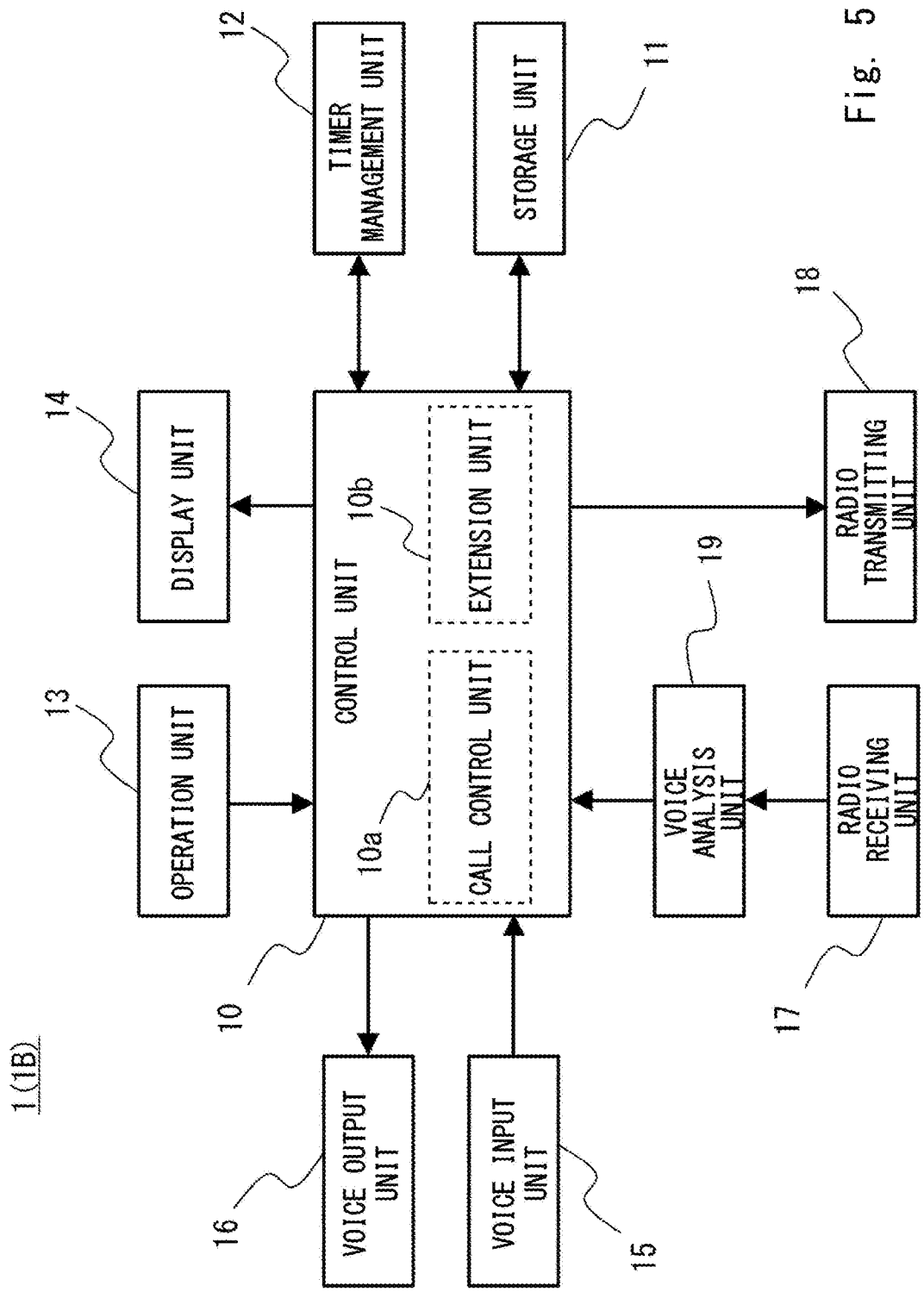
FIG. 5 is a block diagram showing an example of a configuration of the radio apparatus according to the first embodiment.

FIG. 5 shows an example of a configuration of a receiving-side radio apparatus 1 (e.g., the radio apparatus 1B) according to this embodiment. As shown in FIG. 5, the radio apparatus 1 according to this embodiment includes a control unit 10, a storage unit 11, a timer management unit 12, an operation unit 13, a display unit 14, a voice input unit 15, a voice output unit 16, a radio receiving unit 17, a radio transmitting unit 18, and a voice analysis unit 19. Note that the configuration shown in FIG. 5 is a mere example. That is, other configurations may be adopted as long as the radio apparatus 1 can perform the operations according to this embodiment. For example, some of the components shown in FIG. 5 may be formed as one or any number of blocks or devices.

The control unit 10 is a control unit that controls necessary operations based on information input from each component of the radio apparatus 1. The control unit 10 includes a call control unit (a session control unit) 10a that controls the continuation of the call state or the like, an extension unit 10b that extends the call state continuation time based on voice recognition or the like, and so on. For example, the function of the control unit 10 is implemented by having a processor such as a CPU (Central Processing Unit) execute a program stored in the storage unit 11.

The storage unit 11 stores programs and data necessary for the operations performed by the radio apparatus 1. The storage unit 11 stores an ID of the own radio apparatus 1, an ID of the radio apparatus 1 at the other end, a question detection flag that indicates that the voice analysis unit 19 has detected a question, and so on. For example, the storage unit 11 is a nonvolatile memory such as a flash memory, a hard disk drive, or the like. The timer management unit 12 manages operations of a timer according to the instruction from the control part 10. The timer management unit 12 manages the setting, the extension, the start, the stop, the expiration, and the like of a timer for the voice state keeping time (a call continuation timer).

The operation unit 13 is an operation unit that the speaker 2 operates to perform desired communication. The operation unit 13 includes a PTT button for making a call, selecting keys for selecting the destination of the call, and so on. For example, the operation unit 13 may include various keys and switches, or may be a touch panel. The display unit 14 is a display unit that displays images according to the operation performed by the speaker 2, or according to the radio communication. The display unit 14 displays a list of persons and the like to which the owner of the radio apparatus possibly makes a call, a call state of a group call or an individual call, and the like. The display unit 14 is, for example, a liquid crystal display or an organic EL (Electro-Luminescence) display.

The voice input unit 15 is an input unit that receives a voice for a call from the speaker 2, and is, for example, a microphone or the like. A voice can be input to the voice input unit 15 in a state in which the PTT button is being pressed. The voice output unit 16 is an output unit that outputs a voice received from the radio apparatus 1 at the other end, and is, for example, a speaker unit or the like. A voice that is received during a call state is output from the voice output unit 16.

The radio receiving unit 17 is a receiving unit that receives a radio signal from the radio apparatus 1 at the other end. The radio receiving unit 17 receives a radio signal in a channel that is used for a group call or an individual call. The radio transmitting unit 18 is a transmitting unit that transmits a radio signal to the radio apparatus 1 at the other end. The radio transmitting unit 18 transmits a radio signal in a channel that is used for a group call or an individual call. The radio transmitting unit 18 transmits a voice that is input in a state in which the PTT button is being pressed. The radio receiving unit 17 and the radio transmitting unit 18 are also considered to be a communication unit that wirelessly communicates with other radio apparatuses 1.

The voice analysis unit (the voice recognition unit) 19 includes an interface for receiving a voice signal from the radio receiving unit 17, and recognizes a voice of the voice signal that the radio receiving unit 17 has received from the radio apparatus 1 at the other end. The voice analysis unit 19 recognizes a predetermined voice in response to which the call state continuation time should be extended. The predetermined voice to be recognized includes a predetermined keyword and is, for example, a voice containing a question to which a reply from the other party is expected. Examples of the predetermined voice to be recognized includes "Could you hear me?", "Can you hear me?", "Do you hear me?", "Excuse me!", "Hello!", "Are you . . . ?", "Aren't you . . . ?", "Do you . . . ?", "Don't you . . . ?", "Is it . . . ?", "Isn't it . . . ?", "What . . . ?", "Which . . . ?", "Who . . . ?", "When . . . ?", "Why . . . ?", "How . . . ?", "Could you say that again", "Please tell me", and "Please answer". Further, the predetermined voice to be recognized may be one that is used when the speaker himself/herself want to extend the call state continuation time, such as "Hold on, please", "Wait a minute, please", "Wait a second" and "Just a moment". Further, it is preferable to take account of voice parameters such as intonation at the end of a word, accent at the end of a word, a volume of a voice, and a length of a voice. For example, a voice having a volume higher than a predetermined volume or a voice having a length longer than a predetermined length may be recognized as a predetermined voice. Note that the method for recognizing a voice is not limited to any particular methods. For example, machine learning or an arbitrary voice recognition technique may be used.

Figure 6A:
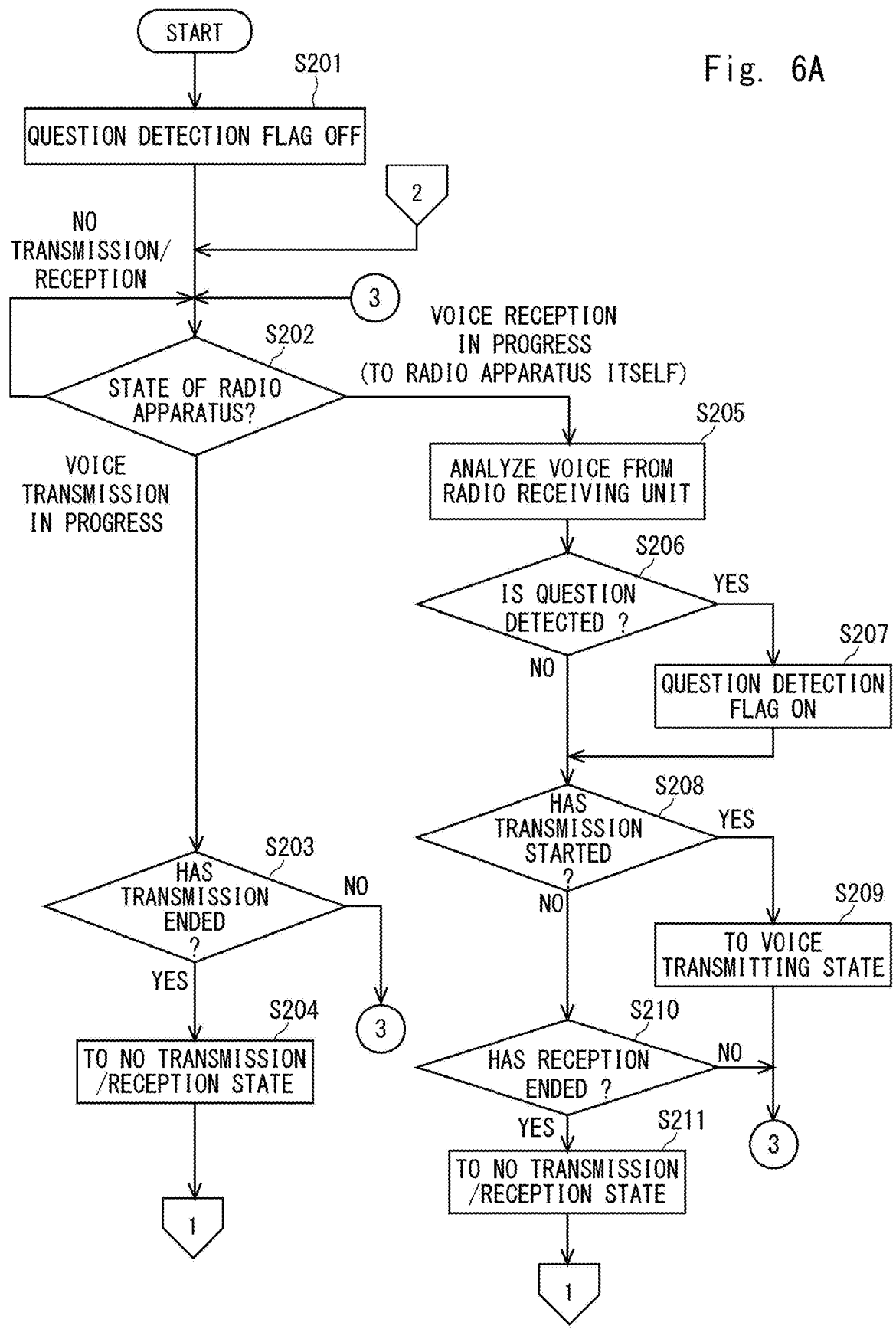
FIG. 6A is a flowchart showing an example of operations performed by the radio apparatus according to the first embodiment.
Figure 6B:
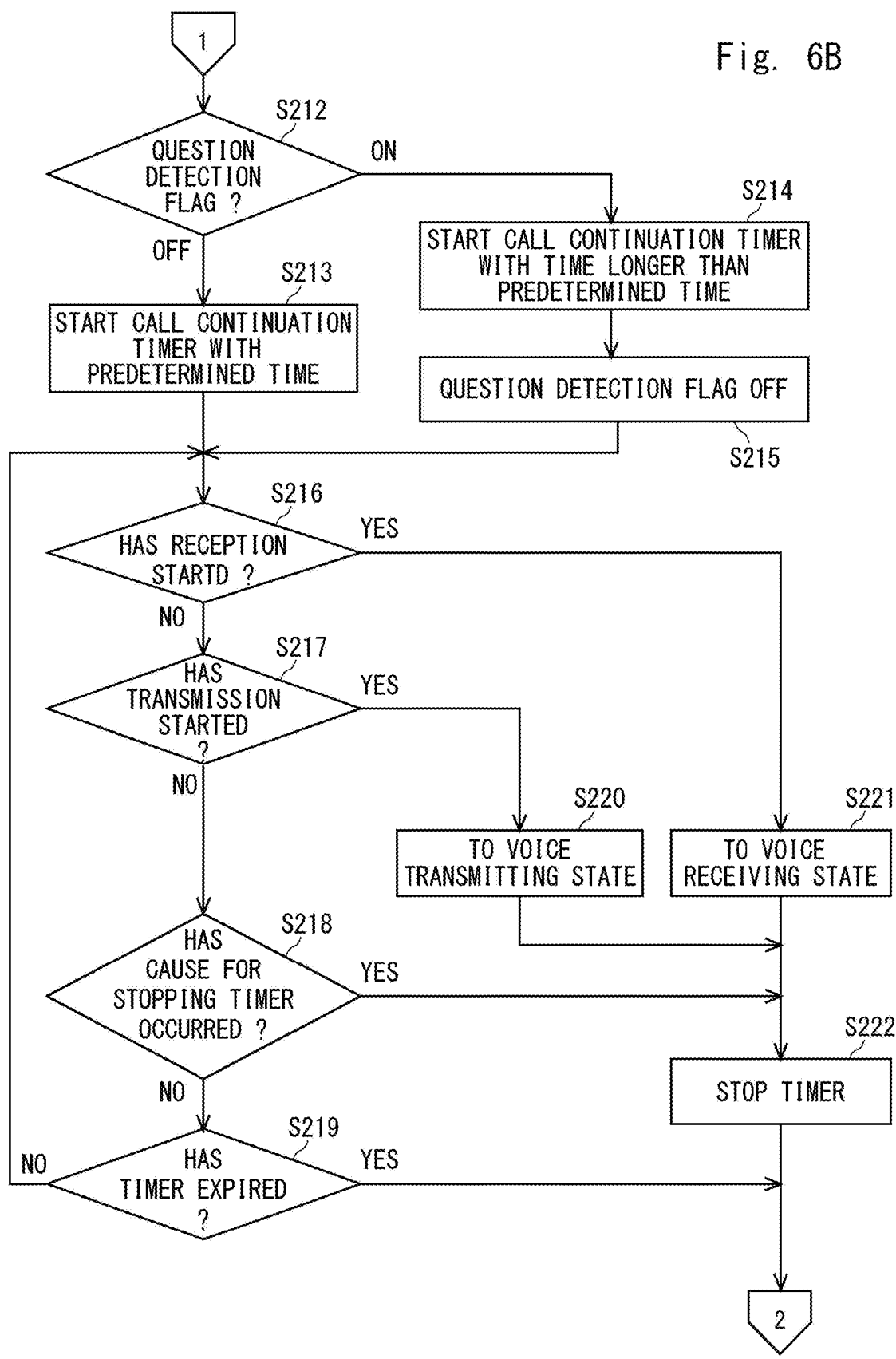
FIG. 6B is a flowchart showing an example of operations performed by the radio apparatus according to the first embodiment.

FIGS. 6A and 6B show an example of operations performed by a receiving-side radio apparatus 1 (e.g., the radio apparatus 1B) according to this embodiment. As shown in FIGS. 6A and 6B, firstly, the control unit 10 initializes the question detection flag stored in the storage unit 11 to OFF (S201). Next, the control unit 10 determines the state of the radio apparatus 1 (S202). Then, when there is no transmission/reception (S202: No transmission/reception), the control unit 10 waits until transmission or reception is started. When the radio apparatus 1 is transmitting a voice (S202: Voice transmission in progress), the control unit 10 waits until the transmission of the voice is finished in response to an operation performed by the speaker 2 (S203) and then performs the next process. That is, the control unit 10 determines whether or not the transmission of the voice has ended (S203). Then, when the transmission of the voice has not ended (S203/No), the control unit 10 returns to the process corresponding to the state of the radio apparatus 1 (S202), whereas when the transmission of the voice has ended (S203/Yes), the control unit 10 determines that the radio apparatus 1 is in the state where there is no transmission/reception (S204) and performs the next process.

On the other hand, when the radio apparatus 1 is in a state where it is receiving a voice addressed to the radio apparatus 1 itself (S202: Voice reception (to itself) in progress), the voice analysis unit 19 analyzes the voice from the radio receiving unit 17 (S205). For example, the voice analysis unit 19 determines whether or not it has detected a "question" from the other party (e.g., the radio apparatus or person at the other end) based on the predetermined keyword (S206). When the voice analysis unit 19 has detected a "question" from the other party (S206/Yes), the control unit 10 sets the question detection flag stored in the storage unit 11 to ON (S207). When the voice analysis unit 19 has detected no "question" (S206/No) or after the question detection flag is set to ON (S207), the control unit 10 performs the next process.

Next, the control unit 10 determines whether or not the transmission of a voice has been started in response to an operation performed by the speaker 2 (S208). Then, when the transmission of the voice has been started (S208/Yes), the control unit 10 determines that the radio apparatus 1 is in the state where it is transmitting the voice (S209) and returns to the process corresponding to the state of the radio apparatus 1 (S202). Further, when the transmission of the voice has not been started (S208/No), the control unit 10 waits until the reception of the voice from the radio apparatus at the other end is finished (S210) and then performs the next process. That is, the control unit 10 determines whether or not the reception of the voice has ended (S210). Then, when the reception of the voice has ended (S210/No), the control unit 10 returns to the process corresponding to the state of the radio apparatus 1 (S202), whereas when the reception of the voice has ended (S210/Yes), the control unit 10 determines that the radio apparatus 1 is in the state where there is no transmission/reception (S211) and performs the next process.

Subsequent to the process that is performed when there is no transmission/reception (S204 or S211), the control unit 10 determines the state of the question detection flag (S212). When the question detection flag is OFF (S212/OFF), the control unit 10 starts the call continuation timer for the timer management unit 12 with the preset time (e.g., 3 seconds) (S213). On the other hand, when the question detection flag is ON (S212/ON), the control unit 10 (the extension unit 10*b*) starts the call continuation timer for the timer management unit 12 with a time (e.g., 10 seconds) longer than the preset time (S214) and initializes the question detection flag to OFF (S215).

Next, the control unit 10 (the voice control unit 10*a*) continues the call state until the call continuation timer expires. The control unit 10 determines whether or not the reception of a voice from the radio apparatus at the other end has been started (S216). Then, when the reception of the voice has been started (S216/Yes), the control unit 10 determines that the radio apparatus 1 is in the state where it is receiving the voice (S221) and stops the call continuation timer (S222). Further, when the reception of the voice has not been started (S216/No), the control unit 10 determines whether or not the transmission of a voice has been started in response to an operation performed by the speaker 2 (S217). On the other hand, when the transmission of the voice has been started (S217/Yes), the control unit 10 determines that the radio apparatus 1 is in the state where it is transmitting the voice (S220) and stops the call continuation timer (S222). Further, when the transmission of a voice has not been started (S217/No), the control unit 10 determines whether or not any cause for stopping the call continuation timer has occurred (S218). Then, when a cause for stopping the call continuation timer has occurred (S218/Yes), the control unit 10 stops the call continuation timer (S222). When no cause for stopping the call continuation timer has occurred (S218/No), the control unit 10 determines whether or not the call continuation timer has expired (S219). Then, when the call continuation timer has not expired (S219/No), the control unit 10 repeats the reception start process (S216) and the subsequent processes. After the call continuation timer is stopped (S222) or when the call continuation timer has expired (S219/Yes), the control unit 10 returns to the process according to the state of the radio apparatus 1 (S202).

<Effect of First Embodiment>

In this embodiment, in the cases where an individual call using a designated ID is made in a digital conventional environment, a predetermined voice is recognized from a received voice signal in the receiving-side radio apparatus. Further, for example, when a "question" to which a reply from the other party is expected is detected, the time until the call state is cancelled is set to a time longer than the preset time by using a PC application. In this way, in this embodiment, in the case where the receiving-side radio apparatus responds to a question sent from the calling-side radio apparatus, even if the response is somewhat delayed, the call (i.e., the response) does not become the transmission for a group call, and instead can be transmitted as an individual call to the calling-side radio apparatus, so that the communication with the intended radio apparatus or person (i.e., the desired apparatus or person) can be performed.

Second Embodiment

Next, a second embodiment will be described with reference to the drawings. The configuration of a radio communication system according to this embodiment is similar to that of the first embodiment shown in FIG. 1. For example, the radio communication system 100 includes a radio apparatus 1A and a radio apparatus 1B.

In this embodiment, an example in which the radio apparatus 1 makes an individual call by designating optional signaling will be described. The optional signaling is, for example, 2-Tone or DTMF (Dual-Tone Multi-Frequency). In an analog/digital conventional environment, when the calling-side radio apparatus 1A starts an individual call, the speaker 2A makes the alert for call (or call) by selecting and designating standby optional signaling for the receiving-side radio apparatus 1B and pressing the PTT button. If the PTT button is pressed without designating optional signaling, no call is established. When the radio apparatus 1B, which has been alerted from the radio apparatus 1A, responds to the call, the radio apparatuses 1A and 1B enter a call state, so that they can make a call (i.e., send their voices) to the other party just by pressing the PTT button without performing the operation for designating the other party. When no call has been started from either of the radio apparatuses 1A and 1B for a certain period, the call state is cancelled. After that, they return to the state in which when they simply press the PTT button (i.e., presses the PTT button without designating optional signaling), no call is established. In the case where optional signaling is performed, the certain period during which the call state is continued, i.e., the time until the call state is cancelled (until the radio apparatus returns from the individual call state to the state before the other party is designated) is also referred to as a "call state continuation time". If the call state continuation time is too long, it takes time for the radio apparatus to automatically return from the individual call state to the state before the other party is designated, thus increasing the number of situations in which calls with other radio apparatuses cannot be performed. Therefore, it is necessary to set the call state continuation time to an appropriate length so that calls such as business calls are not hindered.

<Operation of Second Examined Example>

In order to help the understanding of this embodiment, a second examined example to which this embodiment is not applied will be described. In the second examined example, a call state continuation time can be set in a radio apparatus that performs optional signaling in advance by using a PC application. However, since there is no method for dynamically changing this call state continuation time during the operation, the operation is performed with the call state continuation time having a fixed value. Therefore, in the second examined example, when the call state continuation time is set to a small value, the following problem arises. That is, even when the receiving side attempts to return a reply to a question from the calling side, the intended party (i.e., the intended radio apparatus or person at the other end) may not be able to receive the question or it may take time to return the response. Details of the problem will be described hereinafter.

Figure 7:
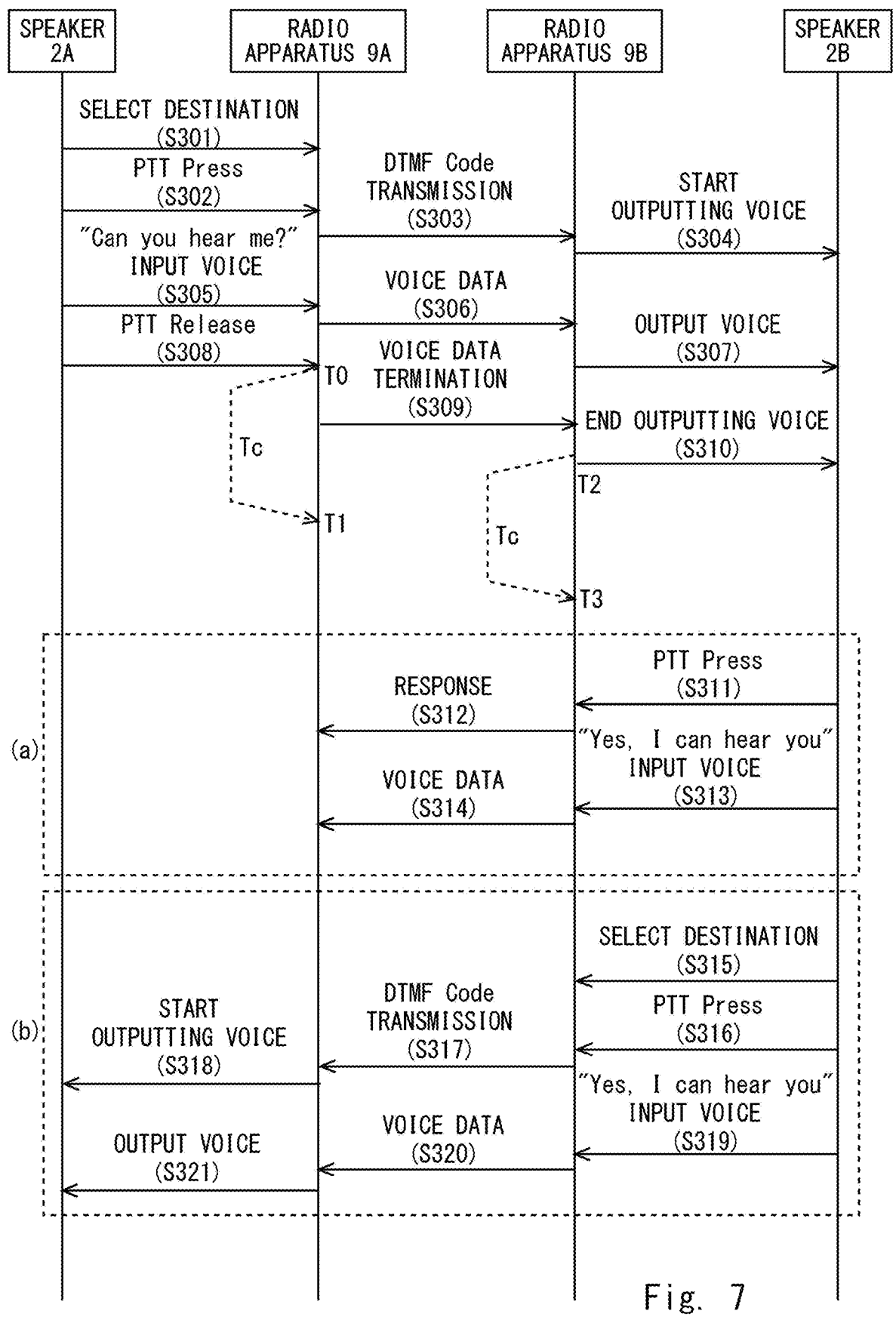
FIG. 7 is a sequence diagram showing an example of operations performed by a radio apparatus according to a second examined example.

FIG. 7 shows operations performed in the second examined example in the casa where the aforementioned problem occurs, and FIGS. 8A to 8D show examples of images displayed in the radio apparatus in such a case. Note that the radio apparatus in the second examined example is referred to as a radio apparatus 9.

Figure 8A:
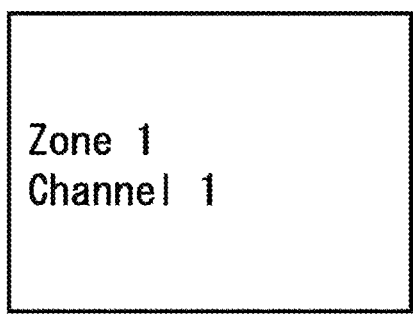
FIGS. 8A to 8D show examples of images displayed in the radio apparatus according to a second embodiment and the radio apparatus according to the second examined example.

FIG. 7 shows an example in which: the radio apparatus makes an individual call by designating optional signaling in an analog conventional environment; and the calling-side radio apparatus 9A is waiting for a DTMF code (9□8□7□6□5□4□3□2□1□0) as optional signaling in response to an operation performed by the speaker 2A, and the receiving-side radio apparatus 9B is waiting for a DTMF code (0□1□2□3□4□5□6□7□8□9) as optional signaling in response to an operation performed by the speaker 2B. For example, the speakers 2A and 2B select a channel that is used by both of their radio apparatuses, and the waiting state in the channel 1 is displayed in each of the radio apparatuses 9A and 9B as shown in FIG. 8A.

Figure 8B:
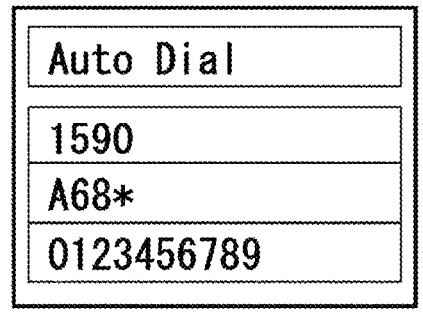
Figure 8C:
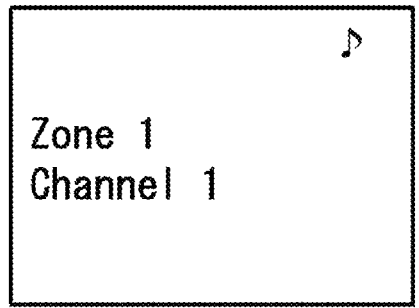

In this state, the calling-side radio apparatus 9A starts the individual call by transmitting the DTMF code (0□1□2□3□4□5□6□7□8□9) to the receiving-side radio apparatus 9B. That is, the radio apparatus 9A displays a list of DTMF codes as shown in FIG. 8B in response to an operation performed by the speaker 2A, and selects the DTMF code (0123456789) of the radio apparatus 9B at the other end (S301). When the speaker 2A presses the PTT button of the radio apparatus 9A in the state where the DTMF code of the radio apparatus 9B is selected (S302), the radio apparatus 9A transmits the selected DTMF code (0□2□3□4□5□6□7□8□9) of the radio apparatus 9B (S303). In this state, as shown in FIG. 8C, the radio apparatus 9A displays the call state of the individual call in the channel 1. When the radio apparatus 9B receives this DTMF code, it starts outputting voices sent from the radio apparatus 9A (S304). At this point, the radio apparatus 9B displays the call state of the individual call in the channel 1 as shown in FIG. 8C.

Next, the speaker 2A asks (i.e., sends) a question "Can you hear me?" from the radio apparatus 9A to the radio apparatus 9B (S305). When the speaker 2A speaks "Can you hear me?" while pressing the PTT button of the radio apparatus 9A, the radio apparatus 9A transmits its voice data to the radio apparatus 9B (S306). Further, upon receiving the voice data, the radio apparatus 9B outputs the voice "Can you hear me?" for the speaker 2B (S307).

After that, the speaker 2A ends the transmission by moving his/her hand off the PTT button of the radio apparatus 9A. When the speaker 2A moves his/her hand off the PTT button of the radio apparatus 9A (S308), the radio apparatus 9A transmits a voice data termination to the radio apparatus 9B (S309). Further, upon receiving voice data termination, the radio apparatus 9B ends the outputting of voices (S310).

Similarly to the first examined example, the calling-side radio apparatus 9A continues the call state from a time T0 at which the hand was moved off the PTT button or it transmitted the voice data termination until a time T1 at which the call state continuation time Tc has elapsed. The radio apparatus 9A displays the state of the individual call during the call state continuation time Tc because during which the call state is continued as shown in FIG. 8C. Then, after the call state continuation time Tc has elapsed, the call state of the individual call ends, so that the radio apparatus 9A displays the waiting state as shown in FIG. 8A. Further, the receiving-side radio apparatus 9B continues the call state from a time T2 at which the outputting of voices ended or it received the voice data termination until a time T3 at which the call state continuation time Tc has elapsed. The radio apparatus 9B displays the state of the individual call during the call state continuation time Tc because during which the call state is continued as shown in FIG. 8C. Then, after the call state continuation time Tc has elapsed, the call state of the individual call ends, so that the radio apparatus 9B displays the waiting state as shown in FIG. 8A.

For example, it is assumed that the call state continuation time Tc, which is set in advance in both the receiving-side calling-side radio apparatus 9A and the receiving-side radio apparatus 9B, is three seconds. Then, as shown in a part (a) of FIG. 7, if the speaker 2B responds to the call by pressing the PTT button of the radio apparatus 9B five seconds after the radio apparatus 9B received the voice data termination from the radio apparatus 9A (S311), the radio apparatus 9A cannot receive this response as described as the above problem. That is, although the radio apparatus 9A needs to receive the DTMF code (9□8□7□6□5□4□3□2□1□0) again, it has not received this DTMF code. Therefore, the radio apparatus 9A does not accept (i.e., receive) the signal sent from the radio apparatus 9B. In this situation, even if the radio apparatus 9B transmits the response (S312) or transmits voice data (S314) obtained through the voice input process (S313), the response is not received by the radio apparatus 9A. As described above, in the second examined example, even if the radio apparatus 9B transmits a response to the individual call from the radio apparatus 9A, the radio apparatus 9B does not receive this response. Therefore, the intended call (i.e., the desired call) cannot be made.

Figure 8D:
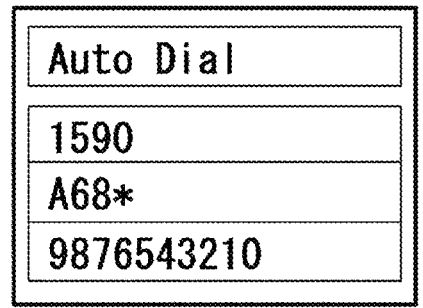

Further, as shown in a part (b) of FIG. 7, when the radio apparatus 9B displays a list of DTMF codes according to an operation performed by the speaker 2B as shown in FIG. 8D, selects the DTMF code (9□8□7□6□5□4□3□2□1□0) of the radio apparatus 9A five seconds after the radio apparatus 9B received the voice data termination from the radio apparatus 9A (S315), and responds to the call by pressing the PTT button of the radio apparatus 9B (S316), the radio apparatus 9A can receive the response from the radio apparatus 9B. However, since the voice data cannot be transmitted until the radio apparatus 9B completes the transmission of the DTMF code (9□8□7□6□5□4□3□2□1□0), it takes time before the radio apparatus 9B returns the response as described as the above problem. Under this circumstance, the radio apparatus 9B transmits the DTMF code (S317) in response to the selection of the destination (S315) and the pressing of the PTT button (S316), and the radio apparatus 9A starts outputting voices (S318). Further, the radio apparatus 9B transmits the voice data (S320) in response to the input of the voice (S319), and the radio apparatus 9A outputs the voice (S321). As described above, in the second examined example, since the radio apparatus 9B needs to transmits the DTMF code to the radio apparatus 9A so that the radio apparatus 9A can receive the response, it takes time to make the desired call.

<Operation in Second Embodiment>

In view of the problem like the one described above in the second examined example, in this embodiment, the call state continuation time is extended in both the receiving-side radio apparatus and the calling-side radio apparatus. That is, similarly to the first embodiment, the second embodiment is also configured so that when voice recognition processing is performed for a received voice and, for example, a keyword related to a "question" is detected in the receiving-side radio apparatus, the call state continuation time is dynamically changed to a time longer than the normal time for enabling a longer operation, so that even if the timing at which the response is transmitted is somewhat delayed, a correct response can be returned to the other party (e.g., the person or the radio apparatus at the other end).

Further, in the calling-side radio apparatus, voice recognition processing is performed for a voice that is input from a microphone. Further, for example, when a keyword related to a "question" is detected, the call state continuation time is dynamically changed to a time longer than the normal time for enabling a longer operation. As a result, when the receiving-side radio apparatus returns the response, there is no need to transmit the DTMF code again and hence it can immediately return the response.

Figure 9:
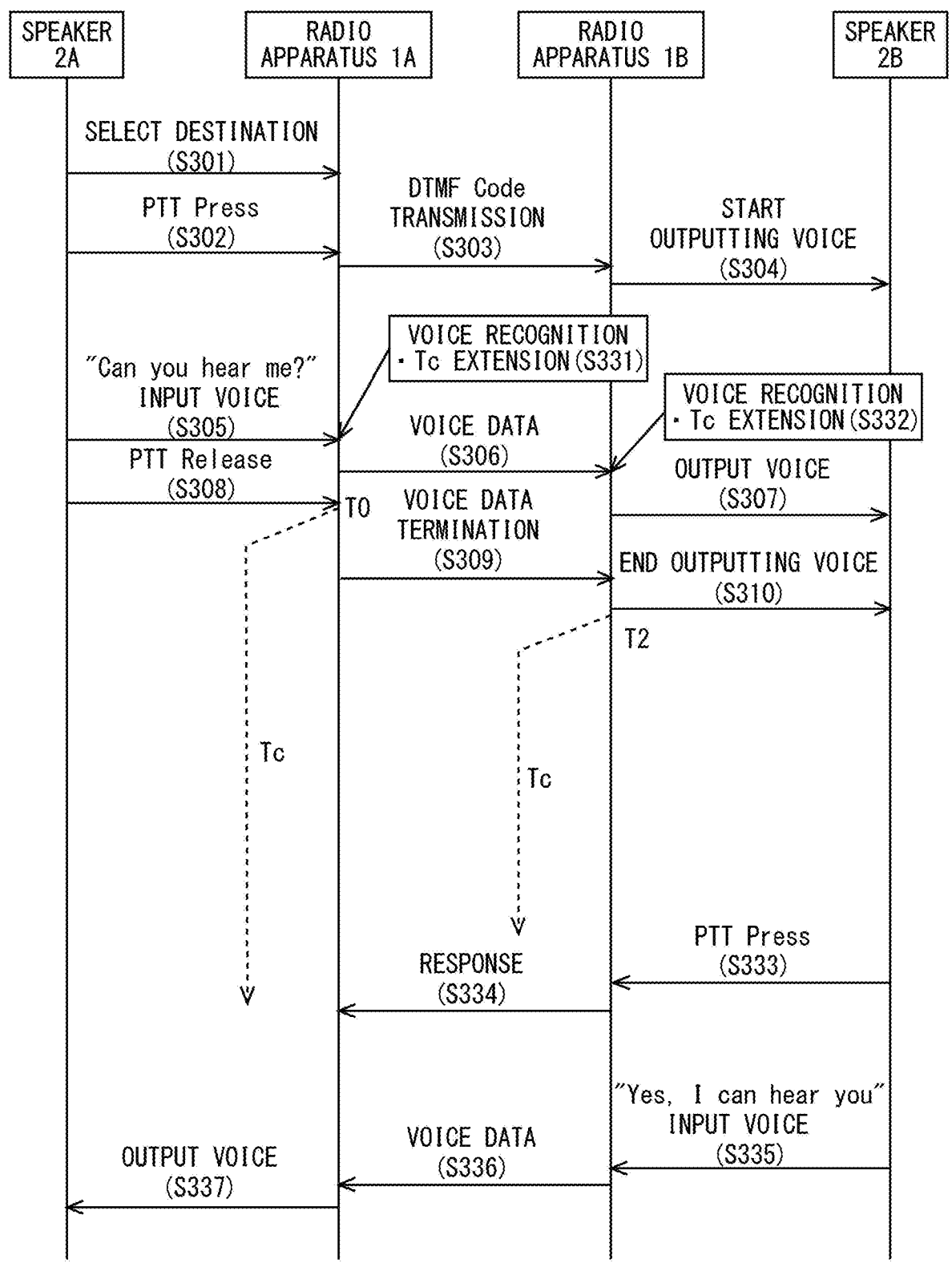
FIG. 9 is a sequence diagram showing an example of operations performed by the radio apparatus according to the second embodiment.

FIG. 9 shows operations performed by a radio communication system according to this embodiment, i.e., performed in a case in which this embodiment is applied to the second examined example shown in FIG. 7.

As shown in FIG. 9, when optional signaling is performed in an analog conventional environment as in the case of FIG. 7, the radio apparatus 1A waits for the DTMF code (9□8□7□6□5□4□3□2□1□0) and the radio apparatus 9B waits for the DTMF code (0□1□2□3□4□5□6□7□8□9) as optional signaling. Then, in this state, the calling-side radio apparatus 1A starts an individual call by transmitting the DTMF code (0□1□2□3□4□5□6□7□8□9) to the receiving-side radio apparatus 1B (S301 to S304).

Next, while pressing the PTT button, the speaker asks (i.e., sends) a question "Can you hear me?" from the radio apparatus 1A for the radio apparatus 1B (S305), and its voice data is transmitted form the radio apparatus 1A to the radio apparatus 1B (S306). Note that in this embodiment, the calling-side radio apparatus 1A analyzes the voice data input from the microphone and recognizes, for example, a "question" therefrom (S331). The radio apparatus 1A, which has recognized the "question" from the voice input from the microphone, dynamically changes and sets the call state continuation time Tc, which is started after the end of the transmission, to a time (e.g., 10 seconds) longer the normal time (e.g., 3 seconds). Similarly to the first embodiment, regarding the length of the time by which the call state continuation time is extended, it may be extended by a predetermined time when the voice is recognized, or may be extended by a time that changes according to the recognized voice. Further, similarly to the first embodiment, the receiving-side radio apparatus 1B analyzes the voice data, which has been wirelessly received from the calling-side radio apparatus 1A, and recognizes, for example, a "question" therefrom (S332). Upon recognizing the "question" from the wirelessly received voice, the radio apparatus 1B dynamically changes and sets the call state continuation time Tc, which has been started when it received the voice data termination from the radio apparatus 1A, to a time (e.g., 10 seconds) longer than the normal time (e.g., 3 seconds). Note that the length of the time by which the call state continuation time is extended in the receiving side is preferably equal to that in the calling side.

After that, the speaker 2A moves his/her hand off the PTT button of the radio apparatus 1A and thereby ends the transmission (S308 to S310). The calling-side radio apparatus 1A continues the call state from a time T0 at which the hand was moved off the PTT button or it transmitted the voice data termination until the extended call state continuation time Tc has elapsed. Further, the receiving-side radio apparatus 1B also continues the call state from a time T2 at which the voice output has ended or it received the voice data termination until the extended call state continuation time Tc has elapsed.

For example, when the speaker 2B attempts to respond to the call by pressing the PTT button of the radio apparatus 1B five seconds after the radio apparatus 1B received the voice data termination from the radio apparatus 1A (S333), the radio apparatus 1A can accept (i.e., receive) the signal sent from the radio apparatus 1B without the need for receiving the DTMF code (9□8□7□6□5□4□3□2□1□0) again because the radio apparatus 1A continues (i.e., maintains) the call state. Further, the radio apparatus 1B also does not need to transmit the DTMF code (9□8□7□6□5□4□3□2□1□0) and hence can immediately return the response. That is, unlike the second examined example, in this embodiment, the radio apparatus 1B transmits the response to the radio apparatus 1A (S334) and the radio apparatus 1A starts outputting voices. As a result, when the speaker 2B speaks "Yes, I can hear you." to the radio apparatus 1B (S335), its voice data is transmitted to the radio apparatus 1A (S336). Further, the radio apparatus 1A outputs the voice "Yes, I can hear you" for the speaker 2A (S337).

<Configuration and Operation of Radio Apparatus on Calling Side in Second Embodiment>

A configuration and operations of a calling-side radio apparatus according to this embodiment will be described. Note that the configuration and operations on the receiving side are similar to those of the first embodiment.

Figure 10:
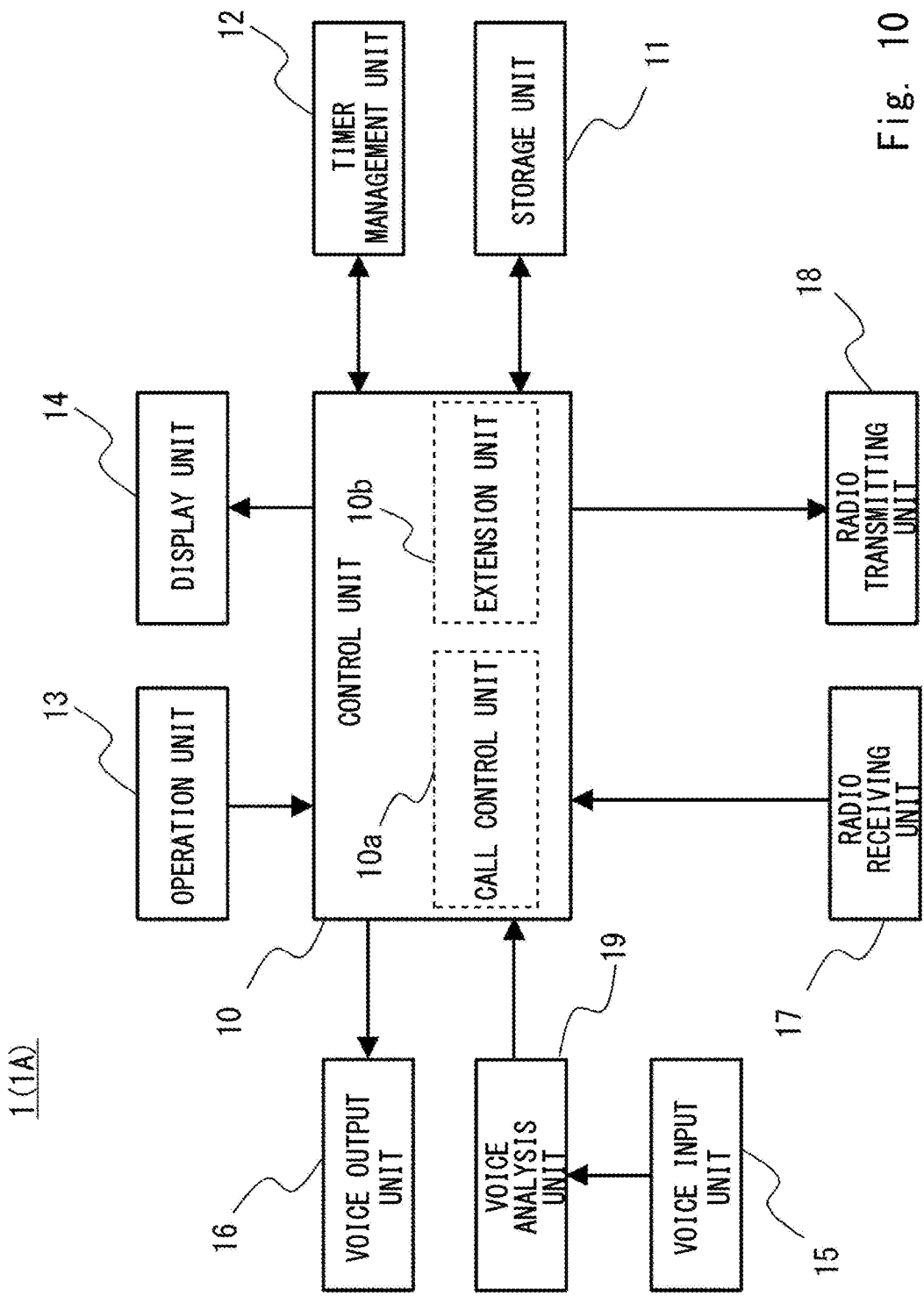
FIG. 10 is a block diagram showing an example of a configuration of the radio apparatus according to the second embodiment.

FIG. 10 shows an example of a configuration of a calling-side radio apparatus 1 (e.g., the radio apparatus 1A) according to this embodiment. As shown in FIG. 10, similarly to the first embodiment, the radio apparatus 1 according to this embodiment includes a control unit 10, a storage unit 11, a timer management unit 12, an operation unit 13, a display unit 14, a voice input unit 15, a voice output unit 16, a radio receiving unit 17, a radio transmitting unit 18, and a voice analysis unit 19. In this embodiment, the voice analysis unit 19 includes an interface for receiving a voice signal from the voice input unit 15, and recognizes a voice of the voice signal that the radio input unit 15 has input from the speaker 2. The rest of the configuration is similar to that of the receiving side of the first embodiment.

Figure 11A:
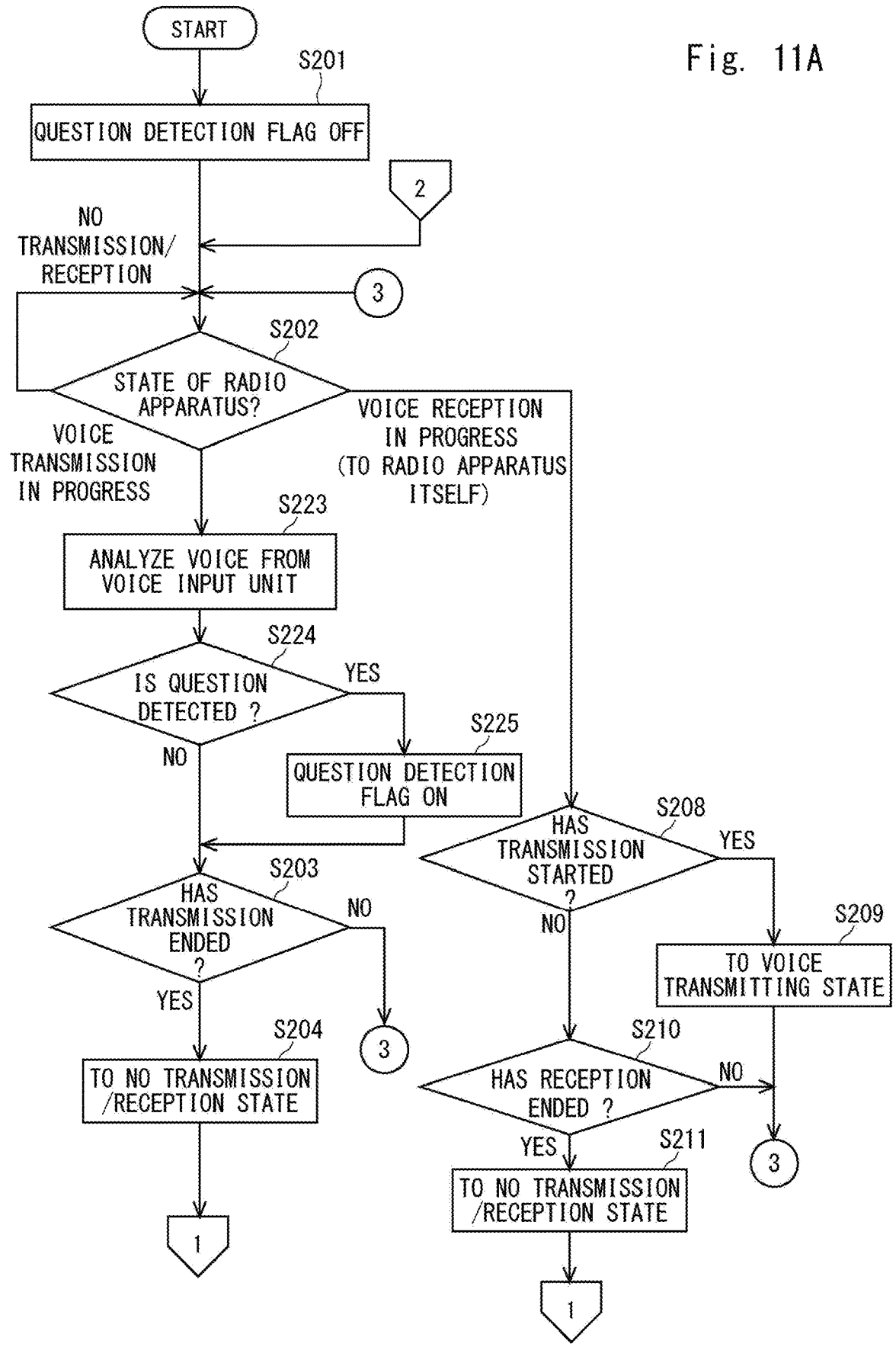
FIG. 11A is a flowchart showing an example of operations performed by the radio apparatus according to the second embodiment.
Figure 11B:
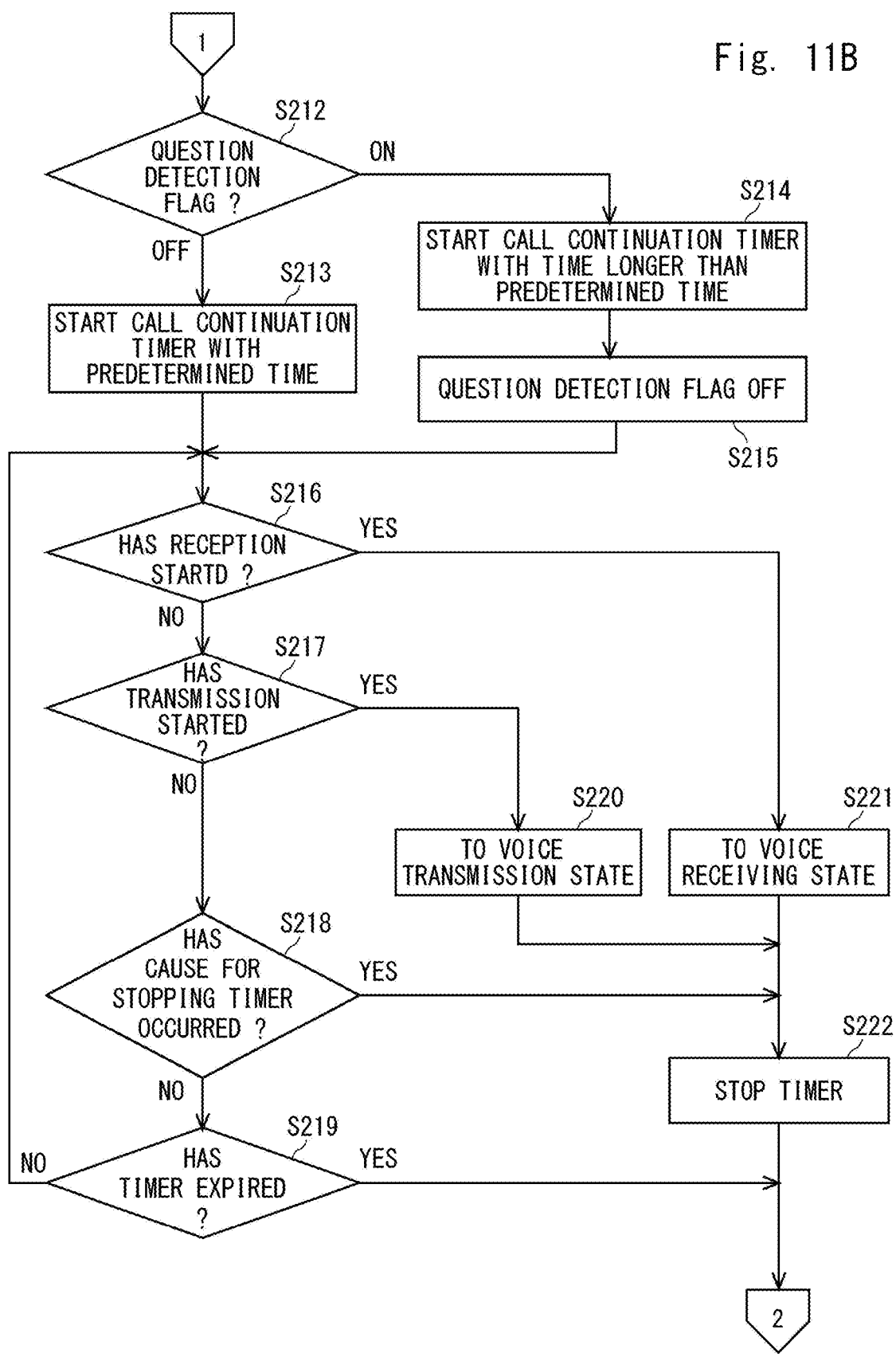
FIG. 11B is a flowchart showing an example of operations performed by the radio apparatus according to the second embodiment.

FIGS. 11A and 11B show an example of operations performed by a calling-side radio apparatus 1 (e.g., the radio apparatus 1A) according to this embodiment. In comparison with the operations in the first embodiment, a process for analyzing a voice sent from the voice input unit during the transmission of a voice (S223 to S225) is added, and the process for analyzing a voice from the radio receiving unit during the reception of a voice addressed to the radio apparatus 1 itself is removed (S205 to S207). The rest is similar to that in the first embodiment.

Firstly, the control unit 10 initializes the question detection flag stored in the storage unit 11 to OFF (S201), determines the state of the radio apparatus 1 (S202), and when there is no transmission/reception (S202: No transmission/reception), waits until transmission or reception is started. When the radio apparatus 1 is in a state where it is transmitting a voice (S202: Voice transmission in progress), the voice analysis unit 19 analyzes the voice from the voice input unit 15 (S223). For example, the voice analysis unit 19 determines whether or not it has detected a "question" from the speaker 2 based on the predetermined keyword (S224). Then, when the voice analysis unit 19 has detected a "question" (S224/Yes), the control unit 10 sets the question detection flag stored in the storage unit 11 to ON (S225). When the voice analysis unit 19 has detected no "question" (S224/No) or after the question detection flag is set to ON (S225), the control unit 10 performs the next process. Next, the control unit 10 waits until the transmission of the voice is finished in response to an operation performed by the speaker 2 (S203) and then performs the next process. That is, the control unit 10 determines whether or not the transmission of the voice has ended (S203). Then, when the transmission of the voice has not ended (S203/No), the control unit 10 returns to the process corresponding to the state of the radio apparatus 1 (S202), whereas when the transmission of the voice has ended (S203/Yes), the control unit 10 determines that the radio apparatus 1 is in the state where there is no transmission/reception (S204) and performs the next process.

On the other hand, when the radio apparatus 1 is in a state where it is receiving a voice (S202: Voice reception (to itself) in progress), the control unit 10 determines whether or not the transmission of the voice is started (S208). Then, when the transmission of the voice is started (S208/Yes), the control unit 10 determines that the radio apparatus 1 is in the state where it is transmitting the voice (S209) and returns to the process corresponding to the state of the radio apparatus 1 (S202). When the transmission of the voice has not been started (S208/No), the control unit 10 waits until the reception of the voice from the radio apparatus at the other end is finished (S210) and then performs the next process. That is, the control unit 10 determines whether or not the reception of the voice has been finished (S210). Then, when the reception of the voice has not been finished (S210/No), the control unit 10 returns to the process corresponding to the state of the radio apparatus 1 (S202), whereas when the reception of the voice has been finished (S210/Yes), the control unit 10 determines that the radio apparatus 1 is in the state where there is no transmission/reception (S211) and performs the next process.

Processes subsequent to the process that is performed when there is no transmission/reception (S204 or S211) are similar to those in the first embodiment. That is, according to the state of the question detection flag (S212), the control unit 10 starts the call continuation timer for the timer management unit 12 with the preset time or a time longer than the preset time (S213, S214). Then, during the period in which the timer is operating, the control unit 10 performs the receiving process (S216 and S221), the transmitting process (S217 and S220), or the like.

<Effect of Second Embodiment>

In this embodiment, when an individual call is made by designating optional signaling, the time until the cancellation of the call state is set to a time longer than the preset time according to the voice recognition of the received voice signal in the receiving-side radio apparatus as in the case of the first embodiment. In this way, when the receiving-side radio apparatus responds to a question from the calling-side radio apparatus, even if the response is somewhat delayed, the transmission (i.e., the response) does not become the transmission for a group call, and instead can be transmitted as an individual call to the calling-side radio apparatus. Further, since the optional signaling does not have to be transmitted again even when the response is somewhat delayed, the response can be immediately returned.

Further, in this embodiment, a predetermined voice is also recognized from a voice signal input from a microphone in the calling-side radio apparatus. Then, similarly to the receiving-side radio apparatus, when the calling-side radio apparatus detects, for example, a "question" to which a reply from the other party is expected, it sets the time until the cancellation of the call state to a time longer than the preset time. In this way, when the receiving-side radio apparatus responds to a question from the calling-side radio apparatus, even if the response is somewhat delayed, the calling-side radio apparatus can receive the response from the receiving-side radio apparatus without receiving the optional signaling again, so that the communication with a desired radio apparatus or person can be reliably performed.

Third Embodiment

Figure 12:
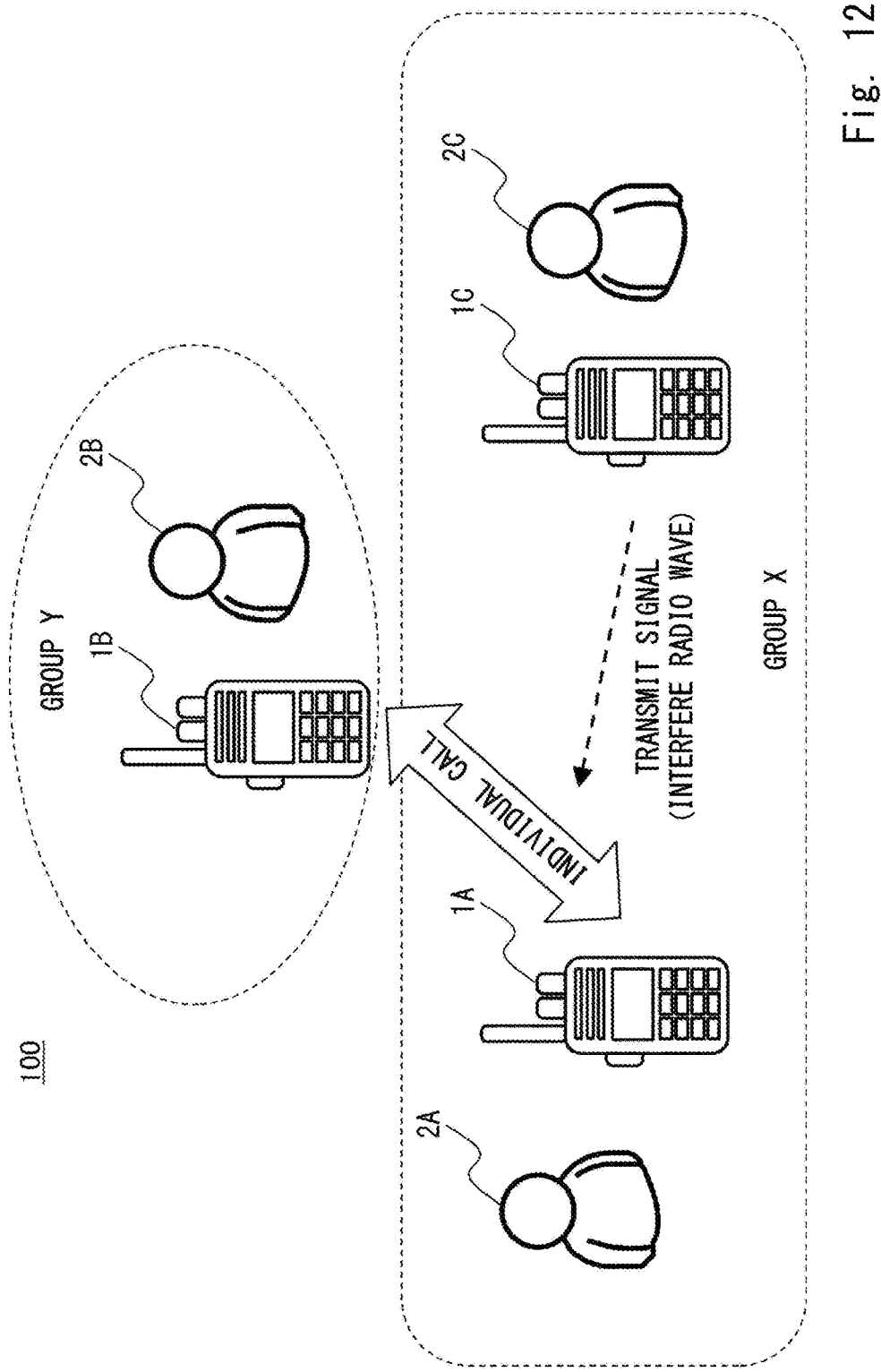
FIG. 12 is a block diagram showing an example of a configuration of a radio communication system according to a third embodiment.

Next, a third embodiment will be described with reference to the drawings. FIG. 12 shows an example of a configuration of a radio communication system according to this embodiment. As shown in FIG. 12, the radio communication system 100 according to this embodiment includes a radio apparatus 1A (a first radio apparatus), a radio apparatus 1B (a second radio apparatus), and a radio apparatus 1C (a third radio apparatus) as in the case of the first embodiment. In this embodiment, similarly to the first embodiment, an example in which the radio apparatus 1 performs a group call and makes an individual call using a designated ID in a digital conventional environment is described.

For example, as shown in FIG. 12, in a state where the radio apparatuses 1A and 1C wait for a call with a group ID=X and the radio apparatus 1B waits for a call with a group ID=Y, the calling-side radio apparatus 1A starts an individual call to the receiving-side radio apparatus 1B. When the radio apparatuses 1A and 1B communicate with each other, if the radio apparatus 1C, which is the other apparatus, transmits a signal at the same frequency, the signal may act as an interference radio wave. Therefore, the radio apparatus 1C has a function of receiving a frequency used by the radio apparatuses 1A and 1B and transmitting no signal at that frequency.

Further, the radio apparatuses 1A and 1B have a function of maintaining the session for a predetermined time even when the communication is interrupted, i.e., even when the PTT button is not pressed by either of the radio apparatuses 1A and 1B. However, in the case of the radio apparatus to which this embodiment is not applied, when the communication between the radio apparatuses 1A and 1B is interrupted, even though the session between the radio apparatuses 1A and 1B is maintained, the radio apparatus can transmit a signal at the frequency at which the radio apparatuses 1A and 1B communicate with each other. Therefore, the radio apparatus interrupts the communication between the radio apparatuses 1A and 1B.

Therefore, in this embodiment, a predetermined time that starts when the communication between the radio apparatuses 1A and 1B is finished is defined as a call state continuation time (a session keeping time), and the radio apparatus 1C is configured so that it does not transmit any signal at the frequency at which the radio apparatuses 1A and 1B have communicated with each other during the call state continuation time. In this way, the transmission of the radio apparatus 1C is stopped in consideration of the call state continuation time for the radio apparatuses 1A and 1B. Therefore, it is possible to prevent the radio apparatus 1C from transmitting a signal that could act as an interfering radio wave during the call state continuation time for the radio apparatuses 1A and 1B.

<Configuration of Radio Apparatus in Third Embodiment>

Figure 13:
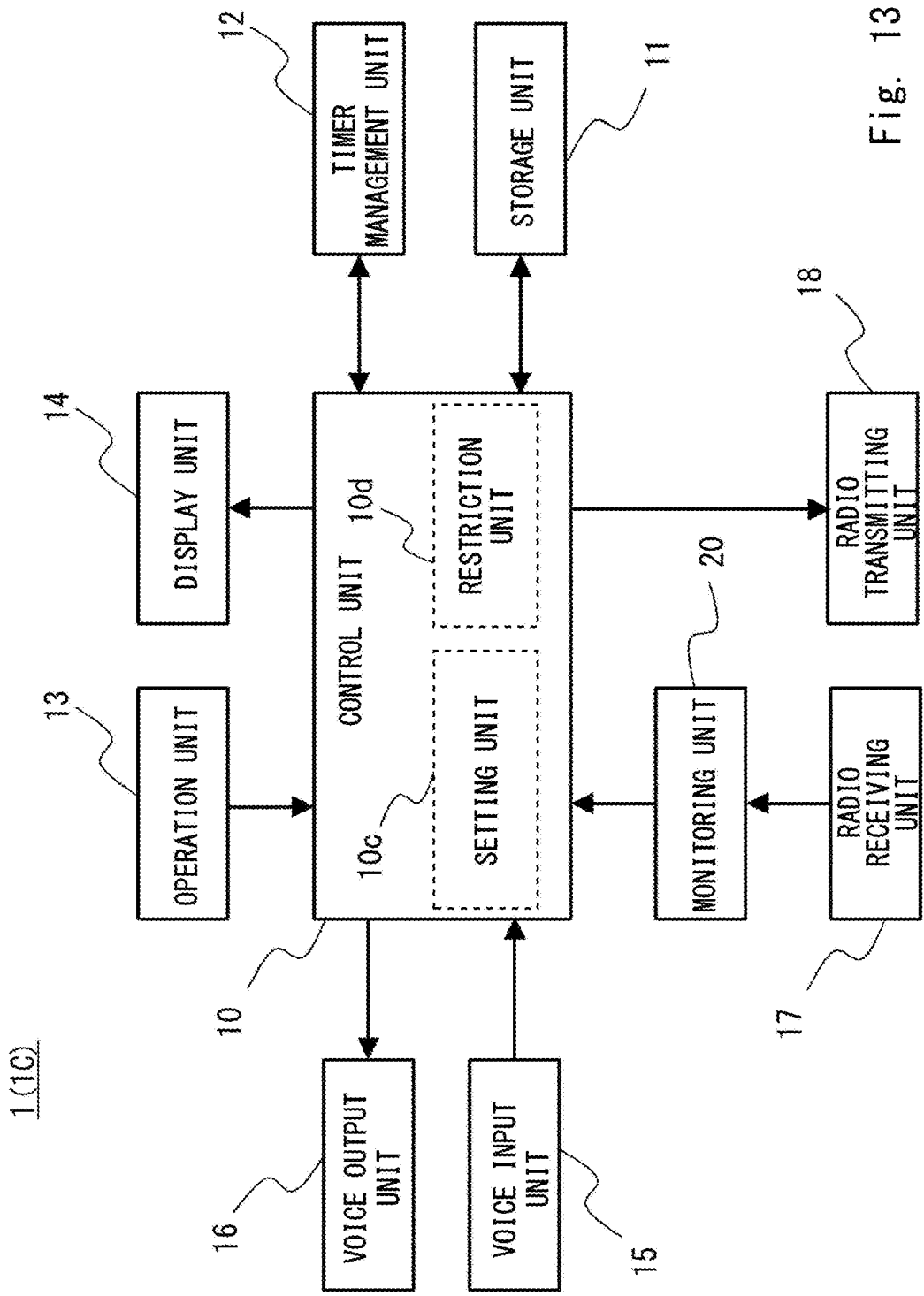
FIG. 13 is a block diagram showing an example of a configuration of the radio apparatus according to the third embodiment.

FIG. 13 shows a configuration of a radio apparatus 1 (e.g., the radio apparatus 1C) according to this embodiment. As shown in FIG. 13, similarly to the first and second embodiments, the radio apparatus 1 according to this embodiment includes a control unit 10, a storage unit 11, a timer management unit 12, an operation unit 13, a display unit 14, a voice input unit 15, a voice output unit 16, a radio receiving unit 17, and a radio transmitting unit 18. Further, the radio apparatus 1 includes a monitoring unit 20 in place of the voice analysis unit 19. Note that similarly to the first embodiment, the radio apparatus 1 may also include the audio analysis unit 19.

The monitoring unit 20 includes an interface for receiving a radio signal from the radio receiving unit 17, and monitors or acquires a radio signal, such as a voice signal in a predetermined channel and information about a call state continuation time, received by the radio receiving unit 17. Further, in this embodiment, the control unit 10 includes a setting unit 10c that sets a call state continuation time (a session keeping time) during which a call state is maintained between the radio apparatuses 1A and 1B, a restriction unit 10d that restricts the transmission of a radio signal based on the set call state continuation time, and so on. It can be considered that the setting unit 10c is an estimation unit that estimates the call state continuation time for the radio apparatuses 1A and 1B. Further, the storage unit 11 stores a transmission guard flag and the like. The rest is similar to that in the first embodiment.

Modified Example

In this embodiment, the radio apparatuses 1A and 1B may have a function of dynamically controlling the call state continuation time for an individual call as in the case of the first and second embodiments. In this case, the radio apparatus 1C may receive call state continuation time information (session keeping time information) from the calling-side radio apparatus 1A or the receiving-side radio apparatus 1B, and set the call state continuation time based on this information.

As an example, similarly to the first and second embodiments, when a voice that is spoken before the speaker of the radio apparatus 1A or 1B releases the PTT button is analyzed and the analyzed voice corresponds to a question, when the volume of the call is higher than a predetermined volume, or when the duration of the call is longer than a predetermined time, the call state continuation time may be set to a time longer than the predetermined time. In this case, the radio apparatus 1C may receive information indicating that the call state continuation time has been changed from the radio apparatus 1A or 1B. Alternatively, the radio apparatus 1C may estimate the call state continuation time for the radio apparatuses 1A and 1B by performing voice recognition for the call of the radio apparatus 1A or 1B.

Further, as another example, the radio apparatus 1A or 1B may have a function of changing the call state continuation time according to a predetermined operation and transmit information indicating that the call state continuation time has been changed. That is, the call state continuation time may be changed in response to the pressing of a specific button. For example, the session keeping time may be increased by several seconds when a button 1 is pressed, and may be decreased by several seconds when a button 2 is pressed. In this case, the radio apparatus 1C receives the information about this change, estimates the call state continuation time for the radio apparatuses 1A and 1B based on the received information, and performs control so as not to transmit any signal at the same frequency during the estimated time.

FIG. 14 and FIGS. 15A to 15C show an example in which the radio apparatus 1C includes the voice analysis unit 19 and dynamically controls the call state continuation time by recognizing a voice related to a question.

Figure 14:
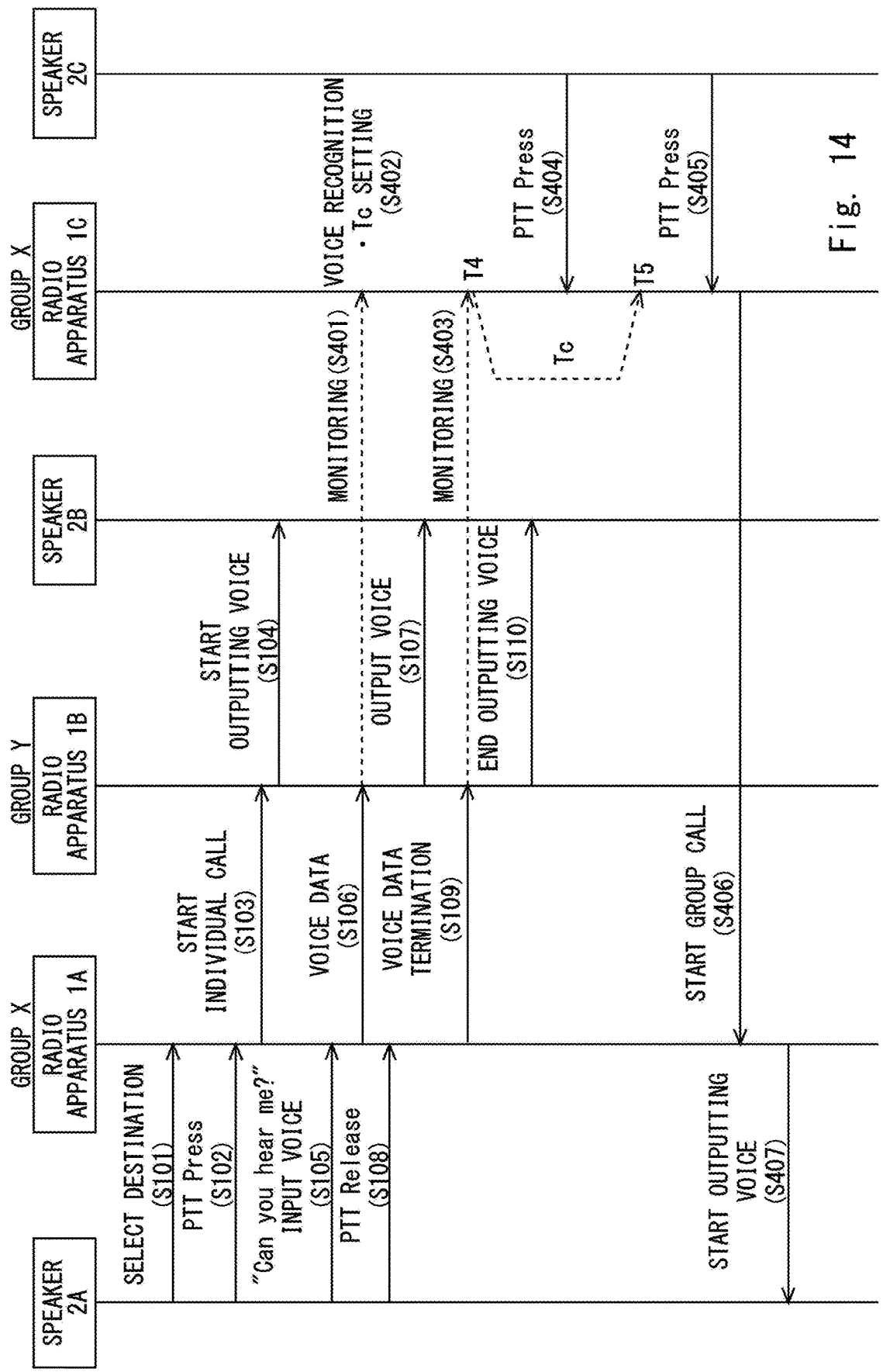
FIG. 14 is a sequence diagram showing an example of operations performed by the radio apparatus according to the third embodiment.

Firstly, operations shown in FIG. 14 will be described. The operations performed by the radio apparatuses 1A and 1B are similar to those in the first examined example and the first embodiment. As shown in FIG. 14, the radio apparatuses 1A and 1C wait for a call with a group ID=X, and the radio apparatus 1B waits for a call with a group ID=Y in a digital conventional environment.

In this state, the calling-side radio apparatus 1A starts an individual call to the receiving-side radio apparatus 1B by designating an ID (S101 to S104). Further, while pressing the PTT button, the speaker asks (i.e., sends) a question "Can you hear me?" from the radio apparatus 1A for the radio apparatus 1B (S105), and its voice data is transmitted form the radio apparatus 1A to the radio apparatus 1B (S106).

At this point, in this embodiment, the radio apparatus 1C, which is the other radio apparatus that is not performing communication, monitors the communication between the calling-side radio apparatus 1A and the receiving-side radio apparatus 1B (S401), analyzes voice data transmitted from the radio apparatus 1A to the radio apparatus 1B, and recognizes, for example, a "question" (S402). Upon recognizing the "question", the radio apparatus 1C sets a call state continuation time Tc for the radio apparatuses 1A and 1B as a period during which the radio apparatus 1C itself does not transmit any signal (or does not make any call).

After that, when the speaker 2A moves his/her hand off the PTT button of the radio apparatus 1A and thereby ends the transmission (S108 to S110), the radio apparatus 1C monitors a voice data termination transmitted by the radio apparatus 1A (S403), enters a call prohibited state from a time T4 at which it detected the voice data termination to a time T5 at which the set call state continuation time Tc has elapsed. That is, even if the speaker 2C attempts to make a call by pressing the PTT button of the radio apparatus 1C during the call state continuation time Tc (S404), the radio apparatus 1C does not make the call. For example, the radio apparatus 1C is guarded (i.e., prevented) from performing a group transmission or an individual transmission to the radio apparatuses 1A and 1B (or to any radio apparatus) even when the PTT button is pressed. Further, after the call state continuation time Tc has elapsed, the radio apparatus 1C enters (i.e., returns to) the state where it can make a call. Therefore, when the speaker 2C presses the PTT button of the radio apparatus 1C (S405), the radio apparatus 1C transmits a group call start (S406). Further, upon receiving this group call start, the radio apparatus 1A starts outputting voices (S407).

Figure 15A:
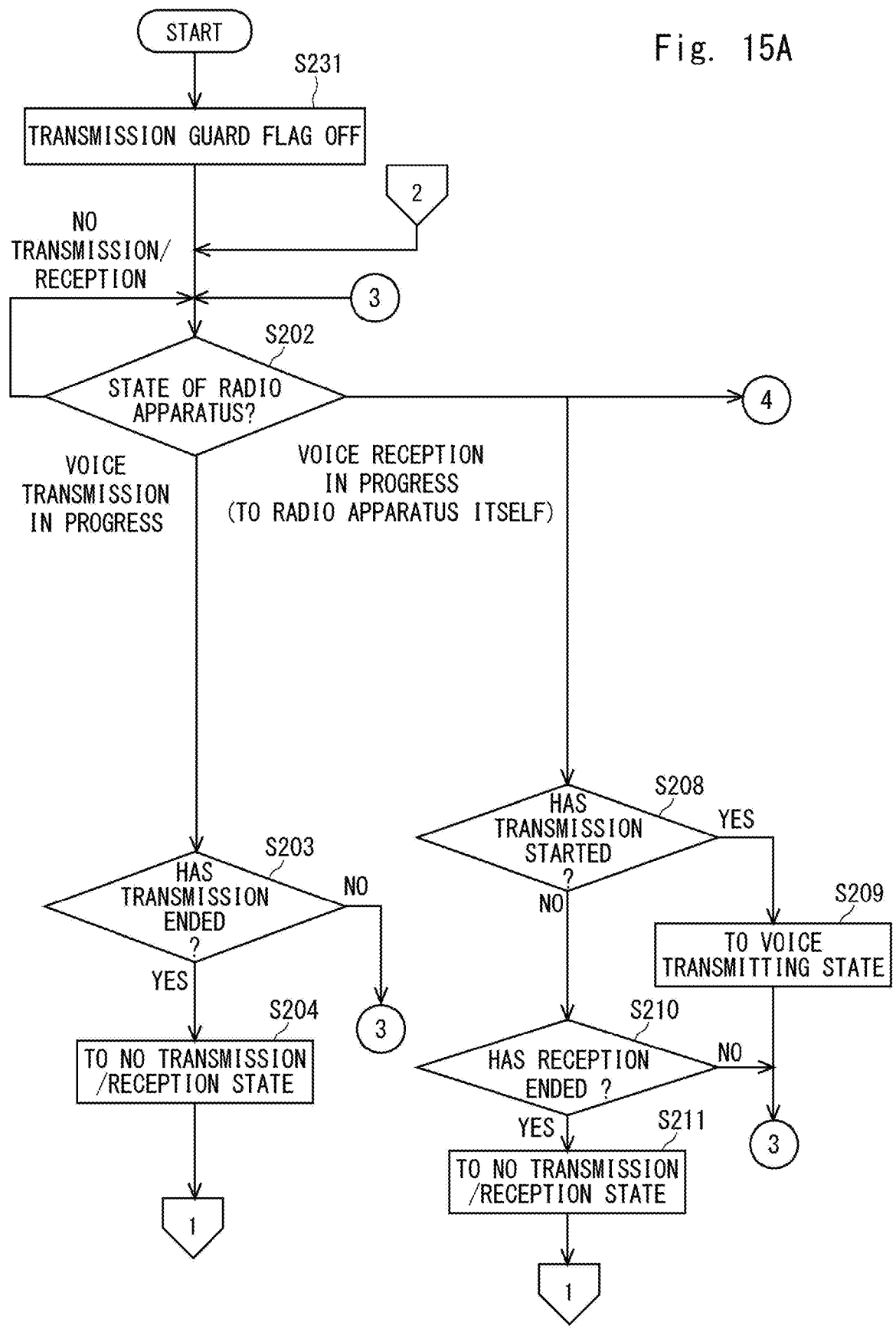
FIG. 15A is a flowchart showing an example of operations performed by the radio apparatus according to the third embodiment.
Figure 15B:
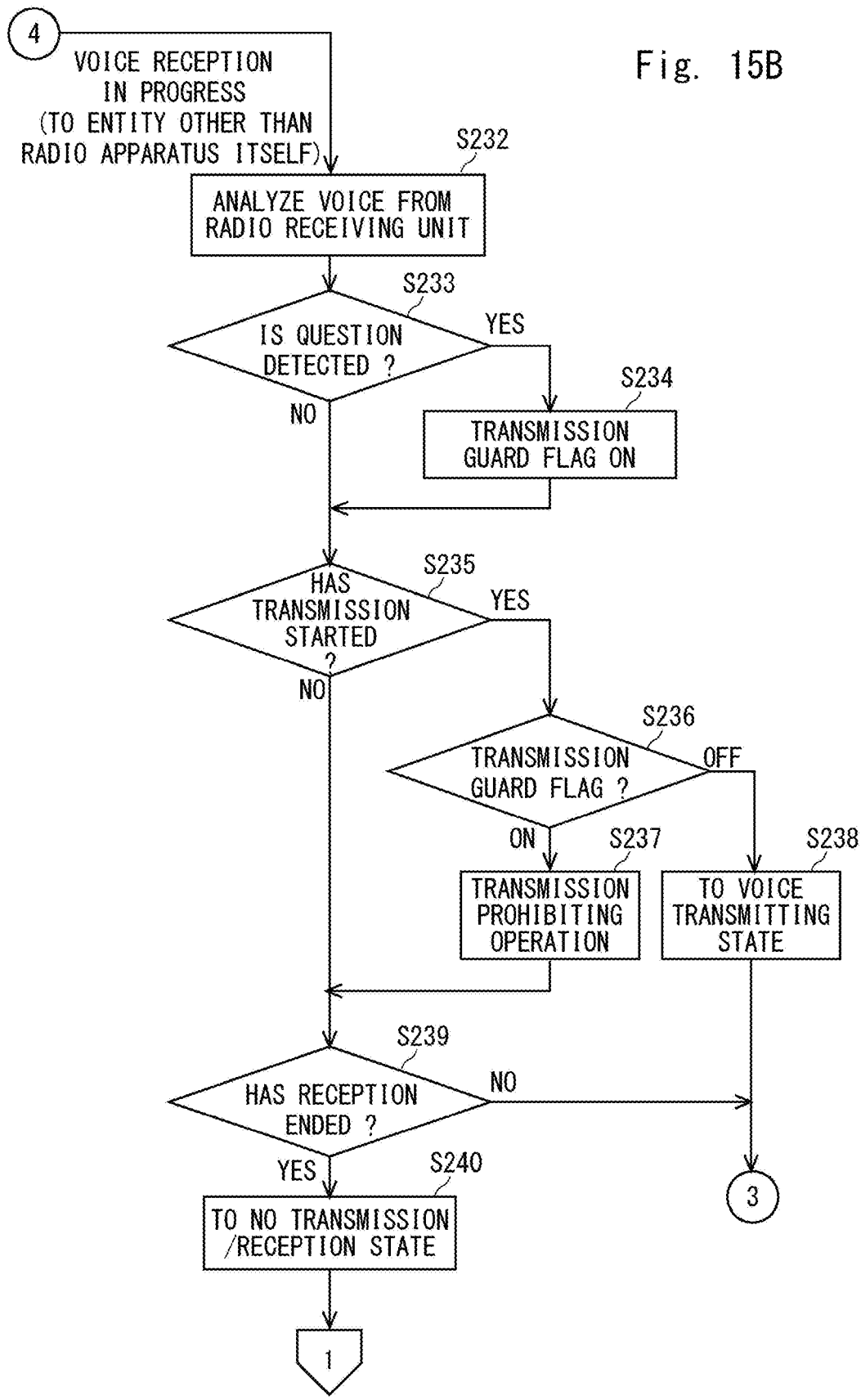
FIG. 15B is a flowchart showing an example of operations performed by the radio apparatus according to the third embodiment.
Figure 15C:
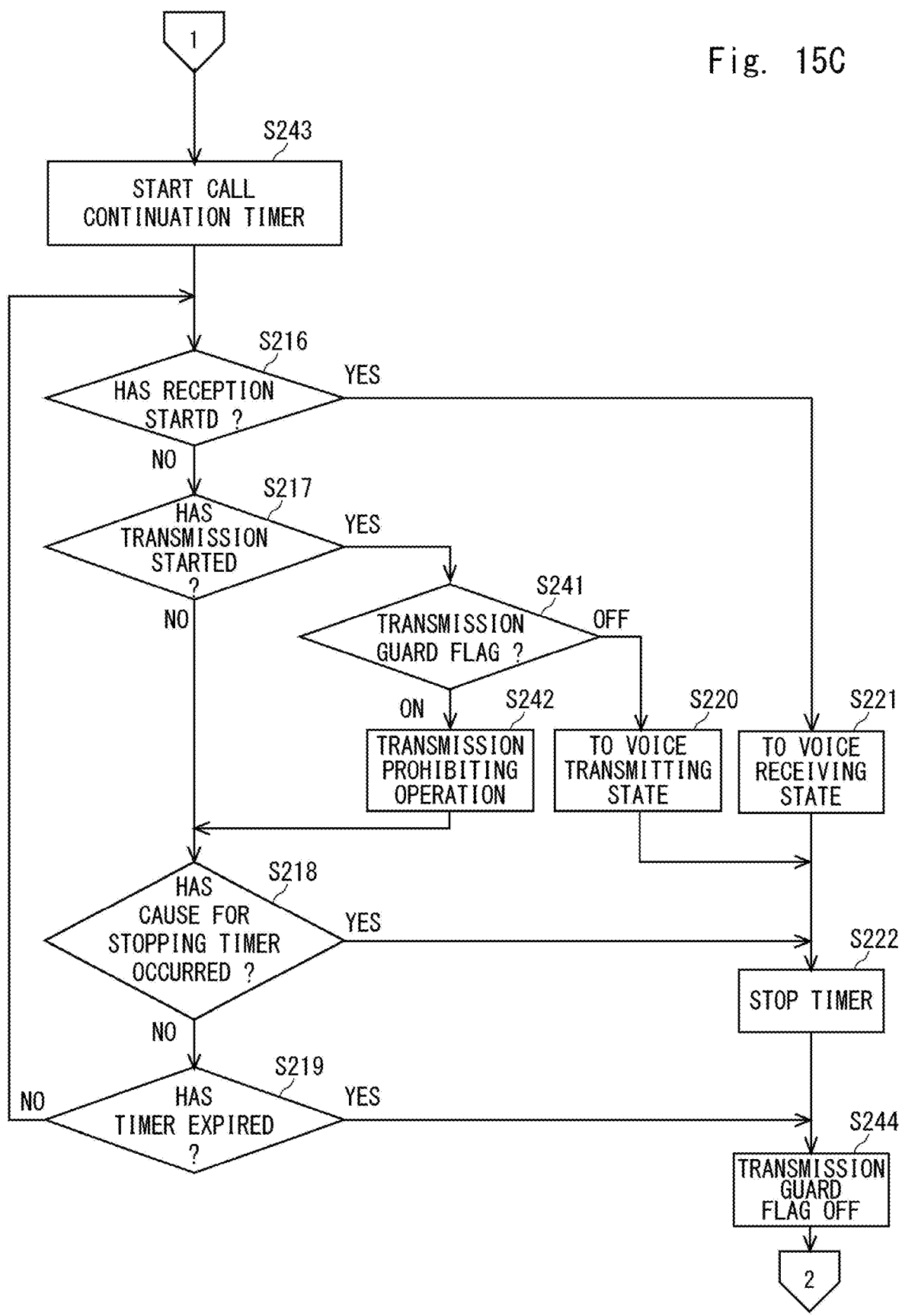
FIG. 15C is a flowchart showing an example of operations performed by the radio apparatus according to the third embodiment.

Next, operations shown in FIGS. 15A to 15C will be described. In comparison with the operations in the first and second embodiments, processes that are performed when the radio apparatus 1 is receiving voices addressed to an entity other than the radio apparatus 1 itself (S232 to S240) and transmission prohibiting operations (S241 and S242) are added. Further, the process for analyzing a voice sent from the voice input unit during the transmission of a voice (S223 to S225) and the process for analyzing a voice sent from the radio receiving unit during the reception of a voice (S205 to S207) are removed. The rest is similar to those in the first and second embodiments.

Firstly, the control unit 10 initializes the transmission guard flag stored in the storage unit 11 to OFF (S231). Next, the control unit 10 determines the state of the radio apparatus 1 (S202). Then, when there is no transmission/reception (S202: No transmission/reception), the control unit 10 waits until transmission or reception is started. When the radio apparatus 1 is in a state where it is transmitting a voice (S202: Voice transmission in progress), the control unit 10 waits until the transmission of the voice is finished (S203) and then performs the next process as in the case of the first embodiment. That is, the control unit 10 determines whether or not the transmission of the voice has ended (S203). Then, when the transmission of the voice has not ended (S203/No), the control unit 10 returns to the process corresponding to the state of the radio apparatus 1 (S202), whereas when the transmission of the voice has ended (S203/Yes), the control unit 10 determines that the radio apparatus 1 is in the state where there is no transmission/reception (S204) and performs the next process. Further, when the radio apparatus 1 is in a state where it is receiving a voice addressed to the radio apparatus 1 itself (S202: Voice reception (to itself) in progress), the control unit 10 determines that the radio apparatus 1 is in the state where it is transmitting a voice (S209) according to whether or not the transmission of a voice is started (S208), or waits until the reception of a voice sent from the other party is finished (S210), and performs the next process as in the case of the second embodiment. That is, the control unit 10 determines whether or not the transmission of a voice has been started (S208). Then, when the transmission has been started (S208/Yes), the control unit 10 determines that the radio apparatus 1 is in the state where it is transmitting the voice according to (S209). When the transmission has not been started (S208/No), the control unit 10 determines whether or not the reception of the voice has been finished (S210). Then, when the reception of the voice has not been finished (S210/No), the control unit 10 returns to the process corresponding to the state of the radio apparatus 1 (S202), whereas when the reception of the voice has been finished (S210/Yes), the control unit 10 determines that the radio apparatus 1 is in the state where there is no transmission/reception (S211) and performs the next process.

On the other hand, when the radio apparatus 1 is in the state where it is receiving (i.e., monitoring) a voice addressed to an entity other than the radio apparatus 1 itself (S202: Voice reception (to entity other than itself) in progress), the voice analysis unit 19 analyzes a voice sent from the radio receiving unit 17 (S232). For example, similarly to the first embodiment, the voice analysis unit 19 determines whether or not it has detected a "question" in a voice addressed to an entity other than the radio apparatus 1 itself (S233). When the voice analysis unit 19 has detected a "question" (S233/Yes), the control unit 10 sets the transmission guard flag stored in the storage unit 11 to ON (S234). When the voice analysis unit 19 has detected no "question" (S233/No) or after the transmission guard flag is set to ON (S234), the control unit 10 performs the next process.

Next, the control unit 10 determines whether or not the transmission of a voice has been started in response to an operation performed by the speaker 2 (S235). Then, when the transmission of a voice has been started (S235/Yes), the control unit 10 determines the state of the transmission guard flag (S236). When the transmission guard flag is ON (S236/ON), the control unit 10 (the restriction unit 10d) performs a transmission prohibiting operation for preventing transmission (S237). When the transmission guard flag is OFF (S236/OFF), the control unit 10 determines that the radio apparatus 1 is in the state where it is transmitting the voice (S238) and returns to the process corresponding to the state of the radio apparatus 1 (S202). When the transmission of a voice has not been started (S235/No) or after the transmission prohibiting operation is performed (S237), the control unit 10 waits until the reception of a voice addressed to an entity other than the radio apparatus 1 itself is finished (S239) and performs the next process. That is, the control unit 10 determines whether or not the reception of a voice has ended (S239). Then, when the reception of a voice has not ended (S239/No), the control unit 10 returns to the process corresponding to the state of the radio apparatus 1 (S202), whereas when the reception of a voice has ended (S239/Yes), the control unit 10 determines that the radio apparatus 1 is in the state where there is no transmission/reception (S240) and performs the next process.

Subsequent to the process that is performed when there is no transmission/reception (S204, S211 or S240), the control unit 10 (the setting unit 10c) starts the call continuation timer for the timer management unit 12 (S243). The set time of the call continuation timer may be a preset time (e.g., 3 seconds), or may be a time longer than the preset time (e.g., 10 seconds) according to the voice recognition.

Next, the control unit 10 determines whether or not the reception of a voice from the radio apparatus at the other end has been started (S216). Then, when the reception of the voice has been started (S216/Yes), the control unit 10 determines that the radio apparatus 1 is in the state where it is receiving a voice (S221) and stops the call continuation timer (S222). Further, when the reception of the voice has not been started (S216/No), the control unit 10 determines whether or not the transmission of a voice has been started in response to an operation performed by the speaker 2 (S217), whereas when the transmission of the voice has been started (S217/Yes), the control unit 10 determines the state of the transmission guard flag (S241). When the transmission guard flag is ON (S241/ON), the control unit 10 (the restriction unit 10d) performs a transmission prohibiting operation for preventing transmission (S242), whereas when the transmission guard flag is OFF (S241/OFF), the control unit 10 determines that the radio apparatus 1 is in the state where it is transmitting a voice (S220) and stops the call continuation timer (S222).

When the transmission of a voice has not been started (S217/No) or after the transmission prohibiting operation is performed (S242), the control unit 10 determines whether or not any cause for stopping the call continuation timer has occurred (S218). Then, when a cause for stopping the call continuation timer has occurred (S218/Yes), the control unit 10 stops the call continuation timer (S222). When no cause for stopping the call continuation timer has occurred (S218/No), the control unit 10 determines whether or not the call continuation timer has expired (S219). Then, when the call continuation timer has not expired (S219/No), the control unit 10 repeats the reception start process (S216) and the subsequent processes. Further, after the call continuation timer is stopped (S222) or when the call continuation timer has expired (S219/Yes), the control unit 10 initializes the transmission guard flag to OFF (S244) and the control unit 10 returns to the process according to the state of the radio apparatus 1 (S202).

<Effect of Third Embodiment>

In this embodiment, in the cases where an individual call using a designated ID is made in a digital conventional environment, the other radio apparatus(es) that is not performing the communication, i.e., the radio apparatus(es) other than the calling-side and receiving-side radio apparatuses is configured so that it does not transmit any signal (or does not make any call) at the same frequency (i.e., the frequency that is used for communication between the calling-side and receiving-side radio apparatuses) during the time in which the call state is presumably maintained between the calling-side and receiving-side radio apparatuses based on the information about the call state continuation time for the calling-side and receiving-side radio apparatuses even when the communication between the calling-side and receiving-side radio apparatuses is interrupted. For example, when the call state continuation time is three seconds, the other radio apparatus does not transmit any signal (or does not make any call) at the same frequency for at least three seconds after the communication between the calling-side and receiving-side radio apparatuses is finished. In this way, it is possible to prevent the call between the calling-side and receiving-side radio apparatuses from being interfered with by the other radio apparatus.

Further, when the calling-side and receiving-side radio apparatuses have a function of dynamically changing the call state continuation time, the other radio apparatus changes the time during which it does not transmit any signal (or does not make any call) at the same frequency based on the information about the changed call state continuation time. For example, when the call state continuation time is changed to four seconds, the other radio apparatus does not transmit any signal (or does not make any call) at the same frequency for at least four seconds after the communication between the calling-side and receiving-side radio apparatuses is finished. In this way, even when the call state continuation time is dynamically changed, it is possible to prevent the call between the calling-side and receiving-side radio apparatuses from being interfered with by the other radio apparatus.

Further, the call state continuation time for the calling-side and receiving-side radio apparatuses is dynamically changed by recognizing a voice in the communication between the calling-side and receiving-side radio apparatuses. For example, when the voice corresponds to a question, when the volume of the voice is higher than a predetermined volume, or when the duration of the call is longer than a predetermined time, the call state continuation time is set to a time longer than the predetermined time. In this way, it is possible to set the call state continuation time according to the voice such as a question in the calling-side and receiving-side radio apparatuses and thereby to effectively prevent the call between the calling-side and receiving-side radio apparatuses from being interfered with by other radio apparatus.

Other Embodiment

Figure 16:
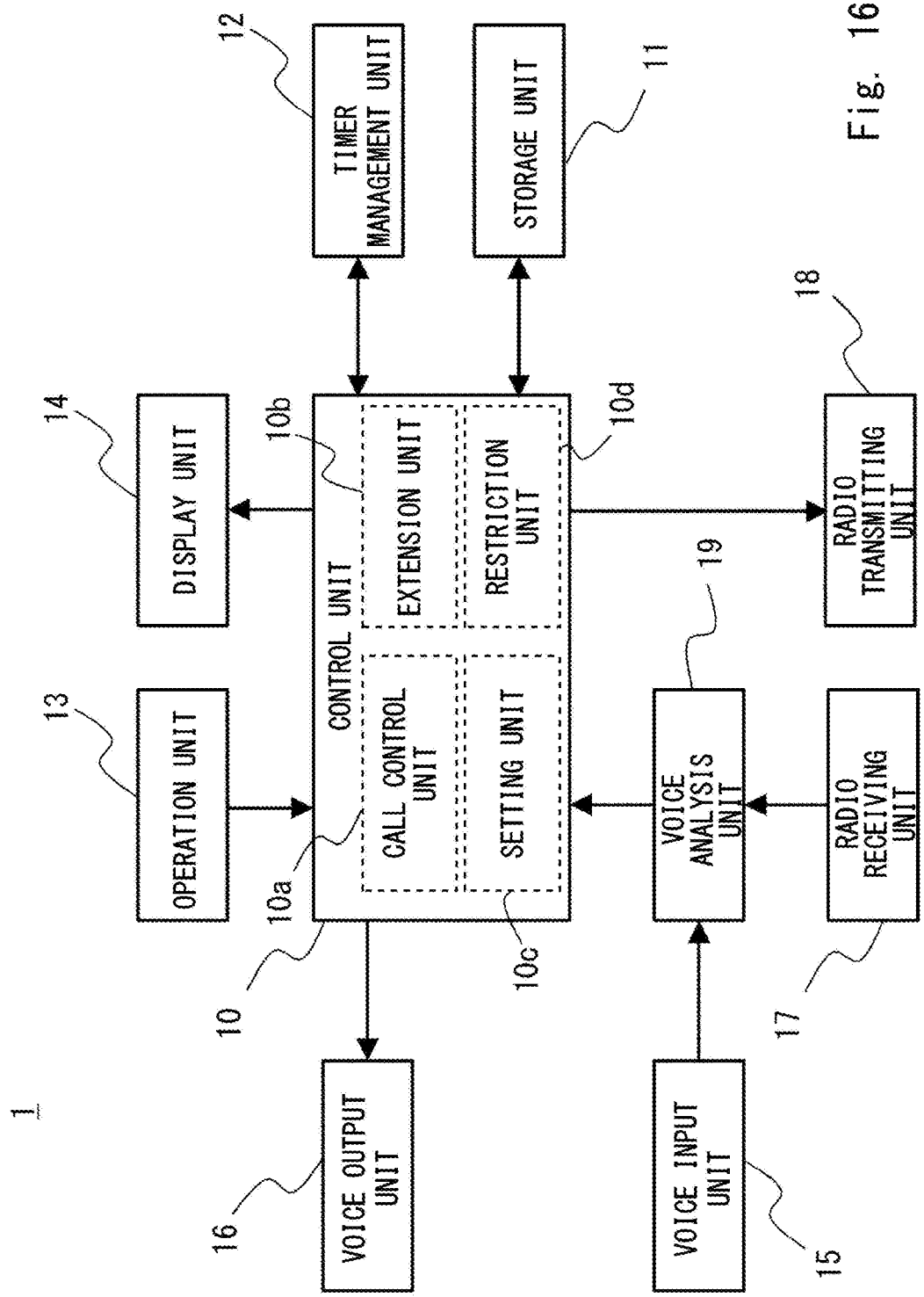
FIG. 16 is a block diagram showing an example of a configuration of a radio apparatus according to another embodiment.

A radio apparatus on the calling side and a radio apparatus on the receiving side are described in the first and second embodiments, respectively, and another radio apparatus is described in the third embodiment. It should be noted that the first to third embodiments may be applied to one radio apparatus. FIG. 16 shows a configuration of a radio apparatus in such a case.

As shown in FIG. 16, similarly to the first to third embodiments, the radio apparatus 1 may include a control unit 10, a storage unit 11, a timer management unit 12, an operation unit 13, a display unit 14, a voice input unit 15, a voice output unit 16, a radio receiving unit 17, a radio transmitting unit 18, and a voice analysis unit 19. In this case, the audio analysis unit 19 analyzes both a voice signal sent from the voice input unit 15 and a voice signal sent from the radio receiving unit 17. Further, the control unit 10 includes a call control unit 10a that controls the continuation or the like of its own call state, an extension unit 10b that extends its call state continuation time, a setting unit 10c that sets a call state continuation time between the radio apparatus 1 and other radio apparatuses, a restriction unit 10d that restricts the transmission of a radio signal, and so on.

Further, operations in this case are similar to those in the first to third embodiments.

As described above with reference to the embodiments, according to the embodiments, it is possible to provide a radio apparatus, a radio communication system, and a radio communication method capable of performing desired communication. Further, according to the embodiment, it is also possible to provide a radio apparatus, a radio communication system, and a radio communication method capable of preventing or reducing interference for communication.

Note that the present disclosure is not limited to the above-described embodiments and they can be modified as desired without departing from the scope and spirit of the present disclosure. For example, the above-described embodiments are not limited to the radio apparatuses for radio systems for business use. For example, they may be applied to general-purpose radio communication apparatuses such as mobile phones and smartphones.

Note that the radio apparatus in the above-described embodiments may be constructed by software, hardware, or both of them. Further, the radio apparatus may be constructed by one hardware device or one software program, or a plurality of hardware devices or a plurality of software programs. Each function (each process) of the radio apparatus may be implemented by a computer having a CPU, a memory, or the like. For example, a program for performing a radio communication method according to the embodiment may be stored in a storage unit, and each function may be implemented by having a CPU execute the program stored in the storage unit.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A radio apparatus comprising:
a memory storing instructions; and
a processor configured to execute the instructions stored in the memory to:
maintain a half-duplex session, which includes an end and an other end, with a radio apparatus at the other end of the half-duplex session for a predetermined session keeping time when a transmission from the radio apparatus at the end of the half-duplex session or the other end of the half-duplex session is ended;
recognize a voice received from the radio apparatus at the other end or to be transmitted to the radio apparatus at the other end in the transmission; and
set a session keeping time to a time longer than the predetermined session keeping time when the recognized voice contains a question.

2. The radio apparatus according to claim 1, wherein the session keeping time is a time which starts when an end of the voice is received from the radio apparatus at the other end and during which the session is maintained.

3. The radio apparatus according to claim 1, wherein the session keeping time is a time which starts when an end of the voice is transmitted to the radio apparatus at the other end and during which the session is maintained.

4. A radio communication system comprising:
a radio apparatus on a calling side, and a radio apparatus on a receiving side, wherein the radio apparatus on the calling side comprises:
a first memory storing instructions; and
a first processor configured to execute the instructions stored in the first memory to;
maintain a half-duplex session with the radio apparatus on the receiving side for a first predetermined session keeping time on the calling side when communication with the radio apparatus on the receiving side is ended;
recognize a voice to be transmitted to the radio apparatus at the receiving side in the communication; and
set a first session keeping time to a first time longer than the first predetermined session keeping time when the recognized voice contains a question, and
wherein the radio apparatus on the receiving side comprises:
a second memory storing instructions; and
a second processor configured to execute the instructions stored in the second memory to:
maintain a half-duplex session on the receiving side with the radio apparatus on the calling side for a second predetermined session keeping time on the receiving side when the communication with the radio apparatus on the calling side is ended;

recognize a voice received from the radio apparatus at the calling side in the communication; and set a second session keeping time to a second time longer than the second predetermined session keeping time when the recognized voice contains the question.

5. A radio communication method comprising:

maintaining a half-duplex session, which includes an end and an other end, with a radio apparatus at the other end of the half-duplex session for a predetermined session keeping time when a transmission from the radio apparatus at an other end of the half-duplex session is ended;

recognizing a voice received from the radio apparatus at the other end or to be transmitted to the radio apparatus at the other end in the transmission; and setting a session keeping time to a time longer than the predetermined session keeping time when the recognized voice contains a question.

6. A radio apparatus comprising:

a radio transmitter-receiver performing radio communication between a first radio apparatus and a second radio apparatus;

a memory storing instructions; and a processor configured to execute the instructions stored in the memory to:

set a predetermined session keeping time during which a half-duplex session is maintained between the first and second radio apparatuses when the communication between the first radio apparatus and the second radio apparatus is ended;

restrict transmission of a radio signal to the first and second radio apparatuses based on the set session keeping time;

recognize a voice received or transmitted in the communication between the first radio apparatus and the second radio apparatus; and set a session keeping time to a time longer than the predetermined session keeping time when the recognized voice contains a question.

7. The radio apparatus according to claim 6, wherein the processor is further configured to execute the instructions stored in the memory to, when the session keeping time in the first or second radio apparatus is changed, set the session keeping time according to the change in the session keeping time.

8. A radio communication system comprising a first radio apparatus, a second radio apparatus, and a third radio apparatus, wherein the third radio apparatus comprises:

a radio transmitter-receiver performing radio communication between the first and second radio apparatuses;

a memory storing instructions; and a processor configured to execute the instructions stored in the memory to:

set a predetermined session keeping time during which a half-duplex session is maintained between the first and second radio apparatuses when the communication between the first radio apparatus and the second radio apparatus is ended;

restrict transmission of a radio signal to the first and second radio apparatuses based on the set session keeping time;

recognize a voice received or transmitted in the communication between the first radio apparatus and the second radio apparatus; and set a session keeping time to a time longer than the predetermined session keeping time when the recognized voice contains a question.

9. A radio communication method comprising:

performing radio communication between a first radio apparatus and a second radio apparatus;

setting a predetermined session keeping time which a half-duplex session is maintained between the first and second radio apparatuses when the communication between the first radio apparatus and the second radio apparatus is ended;

restricting transmission of a radio signal to the first and second radio apparatuses based on the set predetermined session keeping time;

recognizing a voice received or transmitted in the communication between the first radio apparatus and the second radio apparatus; and set a session keeping time to a time longer than the predetermined session keeping time when the recognized voice contains a question.

\* \* \* \* \*